(12) United States Patent
Chanana et al.

(10) Patent No.: US 12,728,560 B2
(45) Date of Patent: Sep. 8, 2026

(54) DENSIFIED HYGROSCOPIC MATERIALS AND PRODUCTS MADE THEREOF

(71) Applicant: Swiss Wood Solutions AG, Altdorf (CH)

(72) Inventors: Munish Chanana, Neuenburg (DE); Gaspard Antoine Clerc, Dübendorf (CH); Philipp Friedrich Siegfried Hass, Zürich (CH); Oliver Frederik Kläusler, Basel (CH); Walter Ulrich Sonderegger, Männedorf (CH); Pascal Wyss, Schwerzenbach (CH)

(73) Assignee: Swiss Wood Solutions AG, Altdorf (CH)

( * ) Notice: Subject to any disclaimer, the term of this patent is extended or adjusted under 35 U.S.C. 154(b) by 308 days.

(21) Appl. No.: 18/039,324

(22) PCT Filed: Nov. 30, 2021

(86) PCT No.: PCT/EP2021/083617
§ 371 (c)(1),
(2) Date: May 30, 2023

(87) PCT Pub. No.: WO2022/112610
PCT Pub. Date: Jun. 2, 2022

(65) Prior Publication Data

US 2024/0001585 A1 Jan. 4, 2024

(30) Foreign Application Priority Data

Nov. 30, 2020 (WO) ................ PCT/EP2020/083947

(51) Int. Cl.
*B27K 5/00* (2006.01)
*B27D 1/04* (2006.01)
(Continued)

(52) U.S. Cl.
CPC ................ *B27K 5/007* (2013.01); *B27D 1/04* (2013.01); *B27K 3/0278* (2013.01); *B27K 5/001* (2013.01);
(Continued)

(58) Field of Classification Search
CPC ...... B27K 5/007; B27K 3/0278; B27K 5/001; B27K 5/0095; B27K 5/065; B27D 1/04;
(Continued)

(56) References Cited

U.S. PATENT DOCUMENTS 5,652,065 A 7/1997 Park et al.
9,962,862 B2 5/2018 Espe
(Continued)

FOREIGN PATENT DOCUMENTS

CA 2103882 A1 2/1995
CN 103331789 B 8/2015
(Continued)

OTHER PUBLICATIONS

Sains Malaysiana 43(2)(2014); 219-225, “Possibility of Improving the Properties of Mahang Wood . . . ” A.F. Ang et al.; XP055679745.
(Continued)

*Primary Examiner* — S. Behrooz Ghorishi
(74) *Attorney, Agent, or Firm* — Lerner David LLP

(57) ABSTRACT

A method for densifying a hygroscopic material is disclosed. The method is for hygroscopic material which may be a natural hygroscopic material or wood—The method comprises the steps of providing the hygroscopic material to be densified; pre-conditioning of the hygroscopic material by adjusting the moisture content of the hygroscopic material to a value within a predefined moisture range, if required; simultaneously heating and pressing the gas-tight packed hygroscopic material under predefined temperature and pressure conditions, whereby the moisture content of the
(Continued)

hygroscopic material is kept constant; and obtaining a densified material.

18 Claims, 4 Drawing Sheets

(51) Int. Cl.
*B27K 3/02* (2006.01)
*B27K 5/06* (2006.01)
*G06K 19/077* (2006.01)

(52) U.S. Cl.
CPC ............ *B27K 5/0095* (2013.01); *B27K 5/065* (2013.01); *G06K 19/07722* (2013.01)

(58) Field of Classification Search
CPC .............. G06K 19/07722; G06K 19/02; G07F 7/0806; B30B 15/064
See application file for complete search history.

(56) References Cited

U.S. PATENT DOCUMENTS

| | | | | |
|---|---|---|---|---|
| 10,572,784 | B1 * | 2/2020 | Kushner | G06Q 20/4012 |
| 2010/0033297 | A1 | 2/2010 | Patovirta | |
| 2016/0012327 | A1 | 1/2016 | Wang | |
| 2016/0193868 | A1 | 7/2016 | Espe | |
| 2016/0286662 | A1 | 9/2016 | Tyler et al. | |

FOREIGN PATENT DOCUMENTS

| | | | |
|---|---|---|---|
| CN | 105593029 | A | 5/2016 |
| CN | 106773237 | A | 11/2018 |
| CN | 108773237 | A | 11/2018 |
| CN | 111185977 | A | 5/2020 |
| CN | 108582377 | B | 1/2021 |
| CN | 107614221 | B | 4/2021 |
| JP | 3136048 | B2 | 2/2001 |
| JP | 2003245907 | A | 9/2003 |
| JP | 2016099762 | A | 5/2016 |
| KR | 1020190012296 | A | 2/2019 |
| RU | 2008103359 | A | 8/2009 |
| RU | 116094 | U1 | 5/2012 |
| RU | 2607725 | C1 | 1/2017 |
| RU | 2015141947 | A | 5/2017 |
| RU | 2629143 | C1 | 8/2017 |
| RU | 2016121510 | A | 12/2017 |
| WO | WO2019133506 | A1 | 7/2018 |
| WO | 2019133806 | A1 | 7/2019 |

OTHER PUBLICATIONS

European Office Action for Appln. No. 21830318.8 mailed Dec. 9, 2024, 5 pages.
CN111185977A English Language Machine Translation.
CN108773237 English Language Machine Translation.
CN108582377 English Language Machine Translation.
CN107614221 English Language Machine Translation.
JP3136048 English Language Machine Translation.
Sains Malaysiana 43(2)(2014): 219-225, "Possibility of Improving the Properties of Mahang Wood . . ." A.P. Ang et al.; XP055679745.
Grigoriev, M.A."A textbook for vocational shools" Wood is used for making furniture, tableware, floor coverings; it is used to make containers, shingles, sports equipment, 2nd edition, revised and supplemented, reviewer from the Department of in technical sciences, K. Petro, 1984, pp. 1-12. (Machine-generated translation attached).

* cited by examiner

DENSIFIED HYGROSCOPIC MATERIALS AND PRODUCTS MADE THEREOF

CROSS REFERENCE TO RELATED APPLICATIONS

This application is a national phase application of International Application No.: PCT/EP 2021/083617, filed on Nov. 30, 2021, which claims priority to priority application PCT/EP2020/083947, filed on 30 Nov. 2020, the content of both of which are herein incorporated by reference.

BACKGROUND OF THE INVENTION

Field of the Invention

The invention relates to a method for densifying a hygroscopic material, especially a natural hygroscopic material, in particular wood. Furthermore, the invention is concerned with a densified material, in particular a densified solid wood and/or a densified wood veneer, which is obtainable or obtained by the inventive method. Further aspects of the invention are related to a laminated structure, a product and a card, especially with electronic functionality, comprising the densified material.

Description of Related Art

Natural material in general is physical matter that can be found in nature. Typically, natural materials are obtained from plants, animals, or the ground. They include organic as well as inorganic matter, such as e.g. stone, wood, cork, bark, fruit peel, canes, grass, shells, egg shells, crustacean exoskeleton or cuticula, natural fibers, biopolymers such as gelatin, cellulose, chitin, various proteins, lignin etc. and the like.

In technical fields, which entail a high consumption of energy and materials, there is a great and increasing demand for renewable raw materials, such as e.g. raw materials based on plants. Renewable materials usually have an advantageous $CO_2$ balance, which is a great advantage when compared to synthetic materials that are typically based on fossil raw materials.

Although natural materials are widely used as materials for many manufacturing endeavors, including the construction of buildings, furniture, tools, etc., they have certain intrinsic drawbacks when compared to highly sophisticated synthetic materials. Specifically, in terms of their composition and structure, natural materials reveal a higher variability in terms of physical and/or chemical properties. Moreover, many natural materials show intense swelling and shrinking behavior upon moisture changes. Furthermore, they are often highly sensible to biological degradation (fungal decay). This is in particular true for porous plant materials, e.g. wood, cellulose fibers and the like.

Therefore, for many parts and product it is challenging to make them of natural materials with a precision, stability and functionality comparable to synthetic analogues. This is especially true for rather small and/or thin parts and products. For example, common electronic cards, such as payment cards, including credit cards, debit cards, prepaid cards, guarantee cards, customer cards, identity cards, access cards (e.g. for doors, barriers, check-in terminals etc.) have a standardized size of 80-90 mm (length)×50-60 mm (width)×0.65-0.85 mm (thickness), as defined in ISO/IEC 7810:2019 under ID-000, ID-1, ID-2, ID-3. Nowadays, these cards usually are made of plastics such as PVC, PET, polycarbonate, PLA or other polymeric materials. Semi wood cards, with a PVC or PET or other plastic inlays (middle layer) and a top and bottom layer out of non-densified wood material also exist. Furthermore, also semi- and full metal cards exist.

Replacing the plastic materials by renewable materials such as wood would be of great interest. However, making wooden cards of common solid wood or laminated veneer lumber (LVL) is hardly possible, because these wood materials either do not allow for the integration of electronic chips or antennas (solid wood) or they do not fulfill the physical and mechanical requirements in terms of thickness, stability, durability, dimensional stability (flatness, resistance to warping) and functional parameters as described in the various relevant standards, such as ISO/IEC 7810:2019 (including ISO/IEC 7811, 7813, 7816 and 14443) and/or similar ones.

With regard to wood, for example, various approaches for modifying the mechanical and chemical properties are known. Usually, these approaches are based on a two-step process involving a chemical modification such as chemical impregnation (liquid or gas phase) as a first step, followed by a physical treatment step. The physical treatment step can be a heat treatment (e.g. to induce a chemical reaction of the wood-own or inserted chemicals) or a physical compression step at different temperatures and moisture contents. These approaches are known as hydrothermal modification (HTM) or viscoelastic thermal compression (VTC) methods.

WO 2019/133806 A1 describes for example a process including the steps of (a) providing a wood member having a moisture content (MC) less than about 19%; (b) preheating the wood member at a temperature of about 120-260° C. in order to reduce the moisture content to a value below 5 wt. %; (c) optionally applying surface water; (d) applying pressure; and optionally cooling the treated wood member prior to (e) providing post-treatment conditioning.

However, in case of wood compression without prior chemical modification, the spring-back effect of the material usually cannot not be significantly reduced, but the swelling in the compression direction is rather enhanced.

To render densified or compressed wood materials dimension stable, a deep and thorough (chemical and/or physical) modification of the wood specimen is required. U.S. Pat. No. 5,652,065 describes for example a wood veneer which is treated so as to have a population of compacted wood cells on at least one major surface and extending into the thickness dimension of the treated veneer. The population of compacted cells confers an increased density, and thus an increased strength and stiffness when compared to an otherwise similar but not treated veneer. To maintain the population of cells in a compacted condition, the treated veneer includes a loading level of a cured rigid polymeric thermoset material interspersed throughout the population of compacted wood cells. However, these treatments result in wood-polymer composites, where the polymer can be of natural or synthetic origin, which usually are non-biodegradable products.

Likewise, to render wood materials transparent or translucent, the wood materials are usually bleached (partial or complete removal of lignin) and subsequently infiltrated with transparent and/or refractive-index matching polymers, such as PMMA (polymethylmethacrylate), resulting again in wood composite materials.

To render wood materials scratch resistant, usually scratch resistant coatings and lacquers are applied, thus exposing a non-wooden surface, i.e. an unauthentic wood surface in terms of color, haptics, glance, odor, but rather a surface with the properties of the coating material.

To render wood materials and surfaces anti-microbial (anti-bacterial, anti-fungal, anti-viral) properties, coatings containing anti-microbial agents (metal and metal oxide nanoparticles, organic bioactive/pharmaceutical agents) are applied, thus resulting again into coated or lacquered wood surfaces.

To render wood materials a pleasant odor, scent or perfume, the common strategy is coating or soaking the wood material with the perfume or its solution or coating formulation, respectively. The odor, scent or perfume usually lasts for few days or weeks, as the molecules involved diffuse into the air, usually in higher amounts in the beginning, thus resulting in strong odor in the beginning and decreasing odor with increasing time.

There is thus a need to provide improved solutions, which overcome the aforementioned drawbacks. Especially, there is a strong need to make available improved natural materials, which offer the possibility to replace synthetic materials in new technical fields and for new applications.

BRIEF SUMMARY OF THE INVENTION

It is an object of the present invention to provide an improved method for producing densified natural material, in particular densified renewable material, and to provide improved densified materials and beneficial products made thereof. Especially the method should allow for producing densified materials with improved chemical and/or mechanical stability when compared with untreated but otherwise identical material. Preferably the method should make it possible to densify the natural materials with as little synthetic additives as required, such that products are obtainable, which have a proportion of synthetic components as low as possible.

Especially, it is an object of the present invention to provide densified and/or compressed wood, which preferably has improved properties with regard to dimensional stability (e.g. a low spring-back or shape memory effect, low swelling and shrinking with humidity, moisture, wetness respectively), increased hydrophobicity (e.g. low moisture/water adsorption, increased water-repellency, low wettability), hardness, scratch-resistance, color-stability against ultraviolet (UV) and visible (VIS) light and/or temperature changes.

Preferably, the method should allow for producing translucent wood-based materials of different natural and artificial colors (bleached, colored or bleached and colored in combination) with variable degree of translucency.

Especially, the method should also allow for producing wood-based materials enabling laser-engraving and cutting with reduced or no incineration, thus allowing for customized and precise cutting (smooth edges) as well as precise surface structuration with surface roughnesses at all relevant length scales, i.e. from nanometer, over micrometer and millimeter up to meter length scales in x, y (i.e. lateral) and z (depth) direction.

In particular, a further object of the present invention is to provide densified and/or compressed wood with precise surface texture, structuration and/or roughness.

Further the method preferably should allow for producing densified natural materials that can be used in responsive elements (touch and/or contactless) and/or back-lit electronic elements, including capacitive or resistive displays, operating elements, control panels, screens, etc., especially elements with touch responsive and contactless features.

Particularly preferred, another object of the present invention is to provide densified wood materials with integrated electronics, such as e.g. metal wires, coils, modules, dies, chips (NFC, RFID, UHF-RFID), antennas, transponders, inductive coils, capacitive or resistive circuits and CPUs.

Another object of the present invention is to provide laminated wood products comprising one, two or more layers of densified wood, especially providing high-density laminated veneer, wood lumber and/or timber.

Another preferred object of the present invention is to provide laminated products comprising one, two or more layers of wood-based material such as paper, plant and/or wood fibers, wood-chips, wood flour, cellulose, starch, lignin, wood bark, wood extractives, algae, chitin-based materials, chitosan-based materials and native wood itself, into or onto the layers of one, two or more layers of densified wood providing high-density laminated veneer, wood lumber and/or timber with integrated layers of natural wood or wood and/or plant-based material.

Especially, another preferred object of the present invention is to provide laminated wood products comprising one, two or more layers of other materials such as metals (e.g. Aluminum, Steel, Copper, Silver, Gold, Titanium), plastics (PLA, PET, PP, PE, PVC etc), synthetic or natural glues, ceramics, glass or any other non-wood-based material (resins, shellac, etc.) into or onto the layers of one, two or more layers of densified wood providing high-density laminated veneer, wood lumber, and/or timber with integrated layers of non-wood-based material.

Another object of the present invention is to provide a card with integrated electronic functionality based on natural materials, especially wood, with improved properties. Especially, the cards shall comply with the physical requirements in terms of dimensions (thickness, size), stability, durability, mechanical properties and functional parameters as defined by the requirements of each specific application field, e.g. standard ISO/IEC 7810:2019 for ID cards.

Another object of the present invention is to provide a wooden inlay (core layer) with integrated electronic functionality based on natural materials, especially wood, in particular densified wood with an imbedded or superposed electronic entity, such as an antenna, a wire, an inductive coil, a conductive layer, an electronic chip, a module, a CPU, either individually or in combination of two or more electronic entities. Especially, the inlays shall enable the manufacturing of wooden cards with integrated electronic functionalities providing multi-layered wooden cards that comply with the physical requirements in terms of dimensions (thickness, size), stability, durability, mechanical properties, electronic features and other functional parameters as defined by the requirements of each specific application field, e.g. standard ISO/IEC 7810:2019 for ID cards or other PCI (payment card industries) standards.

Surprisingly, it has been found that these objects can be achieved by the features of claim 1. Thus, the core of the invention is a method for densifying a hygroscopic material, especially a natural hygroscopic material, in particular wood, comprising the steps of:

a) providing the hygroscopic material to be densified;
b) pre-conditioning of the hygroscopic material by adjusting the moisture content of the hygroscopic material to a value within a predefined moisture range, if required;
c) simultaneously heating and pressing the hygroscopic material under predefined temperature and pressure conditions, whereby the moisture content of the hygroscopic material is kept constant;
d) obtaining a densified material.

A "hygroscopic material" is meant to be a material which is capable of absorbing and/or adsorbing and/or desorbing water within the material. Especially, the hygroscopic material is a porous material. Preferably, the hygroscopic material is present as a formed body.

Especially, the hygroscopic material to be densified is selected from plant materials, natural fiber materials, natural polymeric materials, natural macromolecular materials, synthetic fiber materials, mineral wool, animal wool, protein-based materials.

The "moisture content" is defined as the weight of evaporable water contained in a material divided by the weight of the material in fully dried state. Put differently, the moisture content is a measure of how much evaporable water is present in the material compared to the weight of the material when all of the evaporable water has been released. The moisture content can be measured with a calibrated moisture meter. Such meters are known to the person skilled in the art. For wood, for example, there are pin-type or pinless-type meters which are commercially available from various suppliers.

In step c), the moisture content is kept constant. This means that the moisture content deviates from the moisture content as adjusted in step b) by a maximum of 10%, especially 5%, in particular 1%.

Heating and pressing in step c) can e.g. be effected in a mechanical press with a heating device. A heating device can for example be included in a press ram.

In particular, during pressing in step c), the hygroscopic material to be densified can be placed in between a press insert for obtaining a more uniform pressure distribution. The press insert in particular comprises a more elastic material, e.g. rubber, oriented towards the press ram and a less elastic material, e.g. steel, oriented towards the hygroscopic material to be densified. Especially, a press insert is placed on both sides of the hygroscopic material to be densified.

The pressing in step c) can be effected in a static manner or in a continuous manner. Static manner means that in step c), the whole body of the gas-tight packed hygroscopic material is treated simultaneously all around. In contrast, continuous manner means that during step c), the hygroscopic material is treated in sections, e.g. by continuously feeding the gas-tight packed hygroscopic material into a treatment region or vice versa. Possible feeding rates range from $10^{-4}$ mm/s to 1 m/s.

The "densified material" as obtained in step d) is a material with a higher density than the density of the hygroscopic material originally provided in step a). Especially, the densified material is a material with compressed pores. Compressed pores are meant to be pores, which have been closed due to the densifying process. This typically results in a surface, which is smoother and/or has a reduced absorption towards liquids when compared with the surface of the hygroscopic material as initially provided. This is in particular true if wood is used as the hygroscopic material. In this case, for example, lacquer or other liquid chemicals used to treat the wood surface is absorbed less and thus less lacquer is required to treat the surface. Especially, if wood is used as the hygroscopic material, the surface roughness ($Ra_x$) can be reduced to at least half of the roughness of the wood before densification.

In particular, in the inventive process a hygroscopic porous material is transformed to a highly densified material with compressed pores.

The inventive process allows for producing highly densified materials, especially densified wood materials, with a final density of up to 1'600 kg/m$^3$. Thereby, when compared with the hygroscopic material before treatment, it is possible to improve the chemical and physical properties, such as the mechanical stability, color stability against temperature and UV-Vis light, significantly even without addition of synthetic additives. Thus, highly densified and stable materials with and without any synthetic components can be produced.

When using wood as hygroscopic material to be treated, dimension stability, hardness, scratch-resistance, color-stability against ultraviolet (UV) and visible (VIS) light and temperature stability could be improved remarkably. Furthermore, it is possible to produce translucent wood-based materials, especially without impregnation of any refractive-index matching synthetic polymer, which can transmit light when placed in front of a light source. The translucent properties depend on the wood species, wood fiber and year ring orientation, thickness, natural chemical composition, chemical treatment, degree of densification, and density profile.

The densified wood materials obtained by the disclosed method are suitable for laser-engraving with no incineration in comparison to natural wood or non-densified wood at a given laser intensity, retention time, feed rate, wood species, wood color, etc. This allows for customizing the surface structure and/or surface roughness of the densified wood, thus allowing for customized haptics and wettability properties, e.g. hydrophobicity or omniphobicity.

As it turned out, the inventive method allows for producing densified wood veneers with a thickness as low as 0.01-0.05 mm. In particular, such kind of wood veneers are suitable for producing fully functional cards with integrated electronic functionality. Thereby, it is possible to make cards which comply with the dimensional and mechanical requirements as defined in standard ISO/IEC 7810:2019.

Without being bound by theory, it is believed that the heating and pressing of the hygroscopic material under constant moisture conditions is a key feature of the present invention. Thus, there is no need for steaming of the hygroscopic material, e.g. wood specimens, during the compression step). Evidently, this results in a densified material in a highly stable state, which is maintained even after releasing the pressure and cooling the material to room temperature. Thereby, the spring-back or shape memory effect of the hygroscopic materials, particularly when compared with that one of known densified hygroscopic materials (e.g. produced with regular HTM processes), can be reduced significantly. Hence, the inventive process modifies the hygroscopic material structurally and/or chemically in a unique manner.

Furthermore, densified wood materials obtainable with the inventive method are capable of entrapping active agents such as antimicrobial agents or perfume agents, inside the wood structure, thus providing a reservoir of the active agent deep inside the wood, where the active agents is released slowly to the surface either by time (diffusion to surface) or actively upon physical, chemical or mechanical impact such as sawing, cutting, rubbing, scratching, engraving, cleaning with or without a cleaning agent.

Keeping the moisture content constant in step c) can be achieved in different ways.

Especially, the hygroscopic material to be densified is comprised within a self-contained environment during step c). Thereby, the moisture content is kept constant within the environment and thus the moisture content is in the hygroscopic material to be densified does not change significantly.

For example, the device used for heating and/or pressing can be comprised within a self-contained environment and/or the setup of the device used for heating and/or pressing can be designed such that a self-contained environment is realized by machine parts, e.g. press rams, within the device during operation.

According to a highly preferred implementation of the inventive method, the method comprises a further step b1) of gas-tight packaging of the pre-conditioned hygroscopic material in a gas-tight casing before step c).

A "gas-tight casing" is meant to be a covering encasing the hygroscopic material all-around, which is gas-tight for water vapor under the conditions prevailing in step c). In particular, "gas-tight" means a water vapor leakage rate of $\leq 10^{-2}$ mbar*l/s, preferably $\leq 10^{-3}$ mbar*l/s, especially $\leq 10^{-4}$, particularly $< 10^{-7}$ mbar*l/s. Especially, the gas-tight casing is a gas-tight wrapping and/or a gas-tight container.

Preferably, the gas-tight casing is a foil, a bag and/or a container, which is temperature-resistant under the conditions of step c). In particular the foil is a plastic, rubber and/or metallic foil. Likewise, the bag and the container can be made of plastic, rubber and/or metal. Especially, a container may be compressible.

In step b1), the pre-conditioned hygroscopic material can be packaged in the gas-tight casing at atmospheric pressure, at a reduced pressure or at an increased pressure. Thus, "gas-tight packaging" includes methods such as e.g. "vacuum packaging". Thereby, the pre-conditioned hygroscopic material is gas-tight packaged at a pressure below atmospheric pressure.

Vacuum packaging helps to reduce the oxygen content resulting in a less oxidative environment.

According to a preferred embodiment, in step b1), the pre-conditioned hygroscopic material is vacuum packaged, especially with a pressure below atmospheric pressure, in particular ranging between 0.99 bar and $10^{-5}$ bar, preferably $< 10^{-2}$ bar, particularly $< 10^{-3}$ bar.

Gas-tight packaging of the pre-conditioned hygroscopic material in a gas-tight casing is a highly effective and passive measure for keeping the moisture content constant within the material. The tighter the pre-conditioned hygroscopic material is packed, the more constant the moisture content during step c).

In particular, in step c), the hygroscopic material is heated and pressed according to a predefined pressure profile and a predefined temperature profile. A "profile" is meant to be a temporal course of the pressure and the temperature. Put differently, with the predefined pressure profile and the predefined temperature profile, at any point in time during step d), a specific pressure and specific temperature is associated. This helps to control the densifying process in a very precise and reproducible manner.

Especially, for each type of hygroscopic material to be densified, individually determined pressure and temperature profiles are used.

Preferably, in step b), the moisture content of the hygroscopic material to be densified is adjusted to 5-30%, especially 10-15%.

In step c), preferably, the pressure is increased to a value of 5-50 MPa, especially 8-20 MPa, in particular 10-15 MPa and/or the temperature is increased to a value of 100-220° C., especially 120-190° C., in particular 150° C.-185° C. This is in particular suitable if the thickness of the hygroscopic material to be densified, especially wood, is 0.05-5 mm, especially 0.2-1.2 mm, particularly 0.2-0.6 mm.

In step c), preferably, the pressure is increased to a value of 5-50 MPa, especially 8-20 MPa, in particular 10-15 MPa and/or the temperature is increased to a value of 100-200° C., especially 120-170° C., in particular 140° C.-160° C. This is in particular suitable if the thickness of the hygroscopic material to be densified, especially wood, is higher than 5 mm.

According to a possible implementation, the at least one, especially two, in particular all surfaces or the bulk of the hygroscopic material to be densified is chemically treated with a chemical agent before step b), especially by brushing, rolling, spraying, printing, dipping, or impregnation, in particular with a vacuum or pressure treatment.

The chemical agent can be selected from natural polymers, synthetic polymers, biobased polymers, thermosets, thermoplastics, duroplastics, elastomers, natural resins, synthetic resins, waxes, oils, bioactive agents, pharmaceutical active ingredients, colorants, pigments, adhesives, nanoparticles (NPs), microparticles (μPs), clusters and/or agglomerates of NPs and μPs, sulfur, minerals, glasses, ceramics, organo-metal compounds and/or molten or liquid metals. These agents can be liquids, melts, solutions or dispersions. With such a treatment, the densified material can further be adjusted to specific needs. Especially, if there is a chemical treatment, a proportion of the chemical agent is chosen such that a proportion of the chemical agent is from 0.01-15 wt. %, especially from 0.1-9 wt. %, in particular from 0.5-3 wt. %, with respect to the weight of the hygroscopic material to be treated. However, such treatments are only optional.

According to a highly preferred implementation, there is no chemical treatment before step b), especially no impregnation of the surface of the hygroscopic material to be densified. Since, the inventive method results in highly beneficial densified materials, there is in general no need to chemically treat the hygroscopic materials to be densified.

In particular, the hygroscopic material to be densified is selected from plant materials, natural fiber materials, synthetic fiber materials, mineral wool, animal wool, skin-based materials, chitin-based materials, chitosan based materials, protein-based materials, and/or the mixtures of such materials, e.g. grass, algae, hemp fibers and/or egg shells.

Especially, the hygroscopic material to be densified is selected from coal, char, carbon black and/or active coal.

According to a highly preferred implementation, the hygroscopic material to be densified is selected from wood, especially from lumber, in particular solid wood and/or wood veneers.

The term wood includes native wood as well as modified wood. Wood can e.g. be soft or hard wood. Modified wood stands for chemically and/or physically treated wood. For example, the modified wood can be a wood chemically modified in a gas phase, e.g. in ammonia, wood smoke, and/or another gaseous chemical, or the modified wood is a wood chemically modified in a liquid phase, e.g. acetylated or mineralized wood. Physically modified wood includes for example thermally treated and/or baked wood. Especially, the modified wood is an impregnated wood, in particular with an organic or inorganic compound, e.g. an oil-impregnated wood, or an acetylated wood or a mineralized wood.

Lumber stands for wood that has been processed into wood products of a specific form, e.g. into beams, planks and/or veneers. Solid wood can for example be selected from side boards, rift cut, quarter cut. Veneers can be round rotary sliced, half round sliced, plain sliced, quarter sliced, or rift sliced veneers.

Especially, the wood is selected from any type of angiosperms (hardwoods, flower and fruit bearing, deciduous, e.g. maples, oaks, beech, hickory cherry, walnut) or gymnosperms (softwoods, coniferous, needle-like leaves, evergreen, e.g. firs, spruces, pines, from natural forests or plantations. Furthermore, the part of the tree/wood can be sapwood or heartwood, earlywood or latewood, burls/burrs, roots, leaves and barks. Also marine cellulosic material such as algae, including, green, red, brown and other types of algae. However, other types of cellulosic materials can be used as well.

Preferably, the method is effected such that a density of the obtained densified material is a multiple of raw density of the material, with densification factors of typically 1.01-100, depending on the original density of the raw material. The densification factors are in particular 1.1-50, especially 1.5-20, preferably 2-16. Especially, the density of the obtained densified material is at least 900 kg/m$^3$, especially at least 1'200 kg/m$^3$, in particular at least 1'300 kg/m$^3$, preferably between 1'300-1'600 kg/m$^3$, in particular depending on its original density. These compression degrees typically give rise to significantly enhanced densified materials, especially densified wood materials, which are suitable for a large number of different applications. Nevertheless, other compression degrees might be suitable as well.

Especially, the method is effected such that a tensile strength of the densified solid material is 1.5-4, especially 2-3, times as high as the tensile strength of the hygroscopic material to be densified before the treatment.

In particular, the hygroscopic material to be densified, especially wood, in particular a wood veneer, has a thickness of 0.1-4.0 mm, especially 0.3-1.2 mm, in particular 0.4-0.7 mm and/or the obtained densified material, especially the wood, in particular a wood veneer has a thickness of 0.01-2.0 mm, especially 0.1-0.8 mm, in particular 0.15-0.3 mm.

Especially preferred, step c) comprises the following sub-steps:

- c1) the gas-tight packed hygroscopic material is pre-heated to a first temperature at a first pressure and kept for a predefined first dwell time, whereby preferably the first pressure is equal to ambient pressure;
- c2) while keeping the first temperature, the pressure is raised to a second pressure, especially at a constant rate of pressure increase, and kept for a predefined second dwell time;
- c3) while keeping the second pressure, the temperature is increased to a second temperature, especially at a constant rate of temperature increase, and kept for a predefined third dwell time;
- c4) reducing the temperature to room temperature;
- c5) reducing the pressure to ambient pressure.

This specific process turned out to be highly beneficial, especially when wood is used as the hygroscopic material to be densified. As is turned out, the independent increase of temperature and pressure in a sequential manner result in highly stable densified material. However, for special hygroscopic materials and/or for obtaining special properties in the densified materials, a different process control might be beneficial as well.

In particular, in step c1) the first temperature is from 50-100° C., especially 60-80° C., in particular 65-75° C., and the first pressure is from 0-2 MPa, especially 0.1-1 MPa, in particular >0.1-1 MPa. 0.1 MPa means atmospheric pressure, i.e. apart from ambient air pressure, no additional pressure is applied. Thus, the pressure as indicated in particular stands for the additional pressure applied by the press device.

Especially, the first dwell time is about 1 min-10 hours, especially 1-60 min, more specially 10-20 min and in particular 1-5 min. This is in particular suitable if the thickness of the hygroscopic material to be densified, especially wood, is 0.05-5 mm, especially 0.2-1.2 mm, particularly 0.2-0.6 mm.

Especially, the first dwell time is about 1 min-10 hours, especially 5-60 min, in particular 20 min. This is in particular suitable if the thickness of the hygroscopic material to be densified, especially wood, is higher than 5 mm. This is in particular suitable if the thickness of the hygroscopic material to be densified, especially wood, is higher than 5 mm.

Especially, in step c2), the second pressure is from 5-50 MPa, especially 9-11 MPa. Thereby, preferably, the constant rate of pressure increase is about 0.5-20 MPa/min, especially 5-15 MPa/min, in particular 0.9-1.1 MPa/min. In particular, the second dwell time is about 1-45 min, especially 20-30 min, in particular 1-5 min. This is in particular suitable if the thickness of the hygroscopic material to be densified, especially wood, is 0.05-5 mm, especially 0.2-1.2 mm, particularly 0.2-0.6 mm.

Especially, in step c2), the second pressure is from 5-50 MPa, especially 9-11 MPa. Thereby, preferably, the constant rate of pressure increase is about 0.5-2 MPa/min, especially 0.9-1.1 MPa/min. In particular, the second dwell time is about 1-45 min, especially 20-30 min. This is in particular suitable if the thickness of the hygroscopic material to be densified, especially wood, is higher than 5 mm.

In step c3), in particular, the second temperature is from 100-220° C., especially 120-190° C., preferably between 150-185° C. Thereby, preferably, the constant rate of temperature increase is about 0.5-30° C./min, especially 10-20° C./min, more especially 5-10° C./min, in particular 1.5-2.5° C./min. The third dwell time preferably is about 1-90 min, especially 35-55 min, in particular 5-10 min. A fourth dwell time of ca. 1-120 min can be added optionally at lower or higher temperatures than the third dwell time. This is in particular suitable if the thickness of the hygroscopic material to be densified, especially wood, is 0.05-5 mm, especially 0.2-1.2 mm, particularly 0.2-0.6 mm.

In step c3), in particular, the second temperature is from 130-190° C., preferably between 140-160° C. Thereby, preferably, the constant rate of temperature increase is about 0.5-10° C./min, especially 1-3° C./min, in particular 1.5-2.5° C./min. The third dwell time preferably is about 1-90 min, especially 35-55 min. A fourth dwell time of ca. 10-120 min can be added optionally at lower or higher temperatures than the third dwell time. This is in particular suitable if the thickness of the hygroscopic material to be densified, especially wood, is higher than 5 mm.

In step c4) the temperature is decreased via cooling press rams actively or passively. After the wood specimen has cooled down to room temperature, the pressure is released and opened.

These parameters described above are especially suitable for densifying hygroscopic wood materials and result in densified wood materials with highly improved properties.

Preferably, the inventive method further comprises a step of customizing a surface structure and/or a surface texture of the hygroscopic material to be densified and/or of the densified material.

In particular, the customization of the surface structure and/or of the surface texture is effected during step c), especially by embossing, e.g. by using a mechanical press with a textured and/or structured press ram and/or by using an embossing insert. An embossing insert can e.g. be made out of metal, Teflon, ceramics, plastic materials, densified wood and/or native wood, being placed on one or both side of the hygroscopic material to be densified, especially a wood specimen.

A special kind of 3D structuration can be achieved, where the structuration corresponds to the wood anatomy, i.e. annual rings, late/early wood profile. For this, two veneer sheets are superposed and separated with a thin thermo-resistant plastic foil. The two veneer sheets must come from the same cut in order to have the same wood anatomical features (wood annual rings, late/early wood position etc.). By superposing the two wood veneers sheets, both wood veneers are pressed simultaneously. As the two veneer sheets exhibit the same density profile, the low density regions (usually early wood) of both veneer are densified to higher degree than the high density region (usually late wood), thus creating a 3D surface corresponding to the annual growth rings on the contact surface of both veneer sheets. By exact positioning of the corresponding early wood regions and the late wood regions of the two veneer sheets, a 3D structuration of wood surface following the anatomical wood pattern can be achieved. The outer side of both veneer sheets facing the smooth aluminum plates remain completely smooth and flat, thus yielding one-sided surface structuration. By using 2, 3 or more veneer sheets, one-sided and double-sided structured wood veneers can be obtained.

According to another preferred embodiment, the customization of the surface structure and/or of the surface texture is effected after step c), especially by engraving, e.g. laser engraving and/or CNC-engraving.

However, it is also possible to perform a customization of the surface structure and/or of the surface texture during step c) and/or in addition a further customization after step c).

These methods allow for producing densified materials, especially densified wood materials with a controlled surface roughness from nano, over micro up to millimeter range. Also it is possible to provide hydrophobic, superhydrophobic, omniphobic or even slippery liquid infused porous surfaces (SLIP), when the surfaces are further treated with hydrophobic (oils, fatty acids, waxes) or omniphobic (fluorinated hydrocarbons or perfluorocarbons) agents or any type of hydrophobising coating, lacquer or varnish.

Especially, the customization of the surface structure and/or of the surface texture comprises the step of applying a predefined design, pattern and/or picture onto the surface of the hygroscopic material to be densified and/or of the densified material.

In particular, by the customization of the surface structure and/or of the surface texture, an ultrahydrophobic surface is generated, in particular by micro- and/or nano-structuration, whereby, preferably, the surface has a contact angle with water under standard conditions of 150° or more.

According to a further preferred embodiment, in step a), the hygroscopic material to be densified, especially a wood-based material, is provided in the form of a stack comprising at least two layers, whereby at least one layer, especially at least two, three, four, five or more layers, is/are made of hygroscopic material, and whereby all layers of the stack are densified together. This approach allows for example for densifying several layers of hygroscopic materials simultaneously and/or for producing laminated structures, optionally comprising layers of different materials.

In particular, the stack comprises at least two layers of different hygroscopic materials. For example, the different hygroscopic materials are wood and/or paper.

Preferably, the at least one layer of hygroscopic material comprises or consists of plant-based material, animal-based material and/or wood-based material, especially paper, plant and/or wood fibers, wood-chips, wood flour, cellulose, starch, lignin, wood bark, wood extractives, algae, chitin-based materials, chitosan-based materials, native wood, protein, coal, char, carbon black and/or active coal.

Especially the hygroscopic material comprises or consists of wood, preferably lumber, in particular solid wood and/or wood veneers. In particular, all layers of hygroscopic materials in the stack comprise or consist of wood-based materials.

Especially, the stack furthermore may comprise at least one layer of:

(i) metals and/or metal alloys, e.g. comprising or consisting of Aluminum, Steel, Copper, Silver, Gold, and/or Titanium; and/or (ii) polymeric materials, especially synthetic polymers and/or biopolymers, e.g. PLA, PET, PP, PE, PVC and/or proteins; and/or (iii) inorganic materials, e.g. ceramics, glass, stone, clay, metal-organic frameworks (MOF), zeolites, coal, char, carbon black and/or active coal; or other porous or non-porous inorganic materials.

This allows for producing laminated structures or products comprising one, two or more layers of other materials.

The thicknesses and dimensions of the individual layers can vary within wide ranges, depending on the structures or products to be produced. Suitable thicknesses are for example described above.

If, for example, it is a goal to obtain dimensionally stable flat cards, e.g. payment cards and the like, which are according to ISO/IEC 7810:2019 (including ISO/IEC 7811, 7813, 7816 and 14443) and/or similar ones, the inventive process of producing laminated structures is highly beneficial.

In particular, the process allows for a targeted combination of layers, e.g. 2-48 layers in total, of individual layers of anisotropic materials, e.g. wood, and/or layers of isotropic materials, e.g. paper, fleece, PLA, Protein film etc., with various thicknesses, e.g. ranging from 10 μm to 420 μm per layer, such that a laminated structure and/or card with high dimensional stability, suitable dimensions and proper positioning of electronic and/or magnetic functionalities, e.g. an antenna and chip module, are obtainable. Thereby, anisotropic forces induced by the environmental conditions can be balanced by choosing the right type, number and thickness of the individual layers in the stack.

Specifically, it is possible to produce laminated structures and/or cards that essentially keep their shapes, size and flatness under varying environmental conditions. Put differently, such kind of laminated structures and/or cards are substantially insensitive to varying humidity, wetness, temperature and/or pressure conditions.

Therefore, according to a preferred embodiment, the type, number and thickness of the individual layers in the stack are chosen such that a laminated structure is obtained that can be used for producing a card with mechanical properties according to ISO/IEC 7810:2019 (including ISO/IEC 7811, 7813, 7816 and 14443).

Preferably, the outermost layers in the stack are made from wood-based material, especially wood, preferably lumber, in particular solid wood and/or wood veneers.

In particular, at least one of layers of the stack is treated with an adhesive, especially a synthetic, natural, fossil or bio-based adhesive, and/or at least one adhesive foil is arranged between the layers of the stack, such that all the layers of the stack are bonded together upon densification in order to produce a laminated structure.

For example, in between neighboring layers, adhesive and/or an adhesive foil is placed. In this manner, all of the layers of the stack are bonded together in the densification process.

Especially, the stack comprises an electronic functionality, a magnetic functionality, and/or an optical label. In particular, the electronic functionality is an integrated circuit, a memory device, a tracking device, a sensing device, an electrical wire, an antenna, a capacitive entity and/or an electromagnetic coil. Such kind of electronic functionalities can be included in the stack for producing products with electronic function. However, most preferably, the electronic functionality is selected from an electrical wire, an antenna, a capacitive entity and/or an electromagnetic coil. The functionalities are less temperature sensitive.

Other functionalities can e.g. be added to the stack after densification, as described below.

In particular, the electronic functionality, the magnetic functionality, and/or the optical label is arranged on a layer of cellulosic material, especially on a layer of paper. This allows for arranging the functionality or the label, respectively with a well-defined orientation and in space saving manner. However, other arrangements of the functionalities are possible as well.

In particular, all of the layers in the stack have a same length and width. This allow for producing cuboid laminated structures or products.

However, the in another preferred implementation, the layers in the stack have different lengths and/or widths. This allows for producing two- or three dimensional structures with essentially any kind of shape.

Especially, at least two layers of the stack, especially the outermost layers of the stack, are made of wood. According to a further preferred implementation, at least two layers of the stack are made of wood, whereby the layers are oriented with different wood grain directions. Especially, all adjacent layers have a different grain direction. These configurations can be used to obtain laminated structures or products with improved properties, e.g. improved mechanical properties.

For example an angle between the grain directions of the at least two layers oriented with different grain directions, especially between the adjacent layers, is between 0 and 360°, especially 1°-359°, in particular 30°-45°, especially 60-90°.

Especially, the stack comprises at least three layers, in particular at least four layers, whereby, preferably, a thickness of the outermost layers of the at least three layers is larger than a thickness of the one or more layers located in between the outermost layers. Such configurations are especially suitable for producing cards.

In another preferred implementation, the stack comprises at least three layers, in particular at least four layers, whereby, preferably, a thickness of the outermost layers of the at least three layers is smaller than a thickness of the one or more layers located in between the outermost layers.

According to another preferred embodiment, a surface structure and/or a surface texture of at least one outermost layer of the at least two layers of the stack is customized during step c), especially by embossing, e.g. by using a mechanical press with a textured and/or structured press ram and/or by using an embossing insert. As described above, an embossing insert can e.g. be made out of metal, Teflon, ceramics, plastic materials, densified wood and/or native wood, being placed on the at least one outermost layer one.

Especially the densification is effected such that at least one of the at least two layers of hygroscopic material, e.g. wood material, in the stack is rendered translucent. In particular, more than one or all layers in the stack are rendered translucent. Translucency of the wood materials can be controlled by the thickness, wood type and lignin content of the wood material. For example, lignin rich wood easily can be rendered translucent in the inventive method.

Preferably, during steps b) and c), the outermost layers of the stack are covered with a plastic foil and/or the stack is enclosed in a plastic foil. If an embossing insert is used, the plastic foil preferably is arranged in between the at least one outermost layer and the embossing insert. A further plastic foil may be arranged between the embossing insert and the press, especially a press ram.

In a further preferred implementation, after step d), a recess and/or an engraving is produced at least in one outermost layer of the stack, whereby, preferably, the recess and/or the engraving is produced by laser-engraving and/or laser cutting. This allows for example for providing a receiving area for further elements, e.g. electronic functionalities, and/or for labelling and/or structuring the at least one outermost layer.

Especially, after step d), an electronic functionality, a magnetic functionality, and/or an optical label is placed in the recess, for example by adhesively bonding. In particular, the functionality is a functionality as described above, especially selected from an integrated circuit, a memory device, a tracking device, a sensing device, and/or chip.

Thereby, preferably, an electronic functionality is arranged such that it is in electrical contact with the other electrical functionality, especially an electrical wire, in particular an antenna and/or an electromagnetic coil, already comprised in the stack.

Especially, the recess and/or the engraving is produced such that the layer lying directly under the at least one outermost layer is exposed. In particular, the layer lying directly under the outermost layer is a layer with a color different than the color of the outermost layer. This allow for example for producing a logo, letters and/or numbers in a color different from the color of the at least one outermost layer, e.g. with higher contrast. There is no need of a separate coloring process.

For example, the outermost layer is a layer of densified wood and the layer lying directly under the outermost layer is a layer of metal and/or plastics, e.g. with a golden, silver or copper color.

Furthermore, after step d), the densified stack can be cut to size and/or cut into several individual densified stacks, especially by laser cutting, knives, punch or other of type of cutters. This allows for example for obtaining several individual stacks or laminated structures, e.g. for cards, with only one single densification step. Therefore, such an approach is highly beneficial for efficient mass production.

The inventive method can be part of a method for producing a laminated structure or implemented as a method for producing a laminated structure.

Thus, a further aspect of the invention is concerned with a method for producing a laminated structure, especially a laminated wood structure, whereby the laminated structure is produced with the method as described above.

A laminated structure can be directly produced when the hygroscopic material to be densified is provided in the form of a stack, as described above. Thereby, the laminated structure is produced during densification in step c).

Another possibility for producing a laminated structure is described in the following: For producing a laminated structure, especially a laminated wood structure, a layer of hygroscopic material or a stack as defined above is densified with the inventive method as described above and, afterwards, laminated with at least one further layer, e.g. by adhesively bonding.

Thereby, the at least one further layer is for example made of:

(i) another layer of hygroscopic material densified with the inventive method as described above; and/or
(ii) plant-based material, animal-based material and/or wood-based material, especially paper, plant and/or wood fibers, wood-chips, wood flour, cellulose, starch, lignin, wood bark, wood extractives, algae, chitin-based materials, chitosan-based materials, native wood, protein, coal, char, carbon black and/or active coal; and/or
(iii) metals and/or metal alloys, e.g. Aluminum, Steel, Copper, Silver, Gold, and/or Titanium; and/or
(iv) polymeric materials, especially synthetic polymers and/or biopolymers, e.g. PLA, PET, PP, PE, PVC and/or proteins; and/or
(v) inorganic materials, e.g. ceramics, glass, stone, clay, metal-organic frameworks (MOF), zeolites, coal, char, carbon black and/or active coal; or other porous or non-porous inorganic materials.

In this second process, the laminated structure, at least in parts, is produced after densification.

Especially, the layer of hygroscopic material densified with the inventive method mentioned under item (i) is a layer of translucent material. In particular, more than one or all layers in the stack are translucent layers.

If, before laminating, there is a recess produced in the layer of hygroscopic material or in at least one outermost layer of the stack, an electronic functionality and/or a magnetic functionality can be placed in the recess before laminating, such that upon lamination, the electronic functionality and/or magnetic functionality is embedded within the laminated structure. This allows for example for producing laminated structures or products with fully integrated electronic functions, such as e.g. chips, e.g. NFC, RFID, or UHF-RFID chips.

Especially preferred, the laminated structure is produced such that the laminated structure comprises:

a) a backside made of a layer of a densified or non-densified wood veneer
b) a frontside made of a layer of a densified or non-densified wood veneer
c) optionally, one or more further layers of a densified or non-densified wood veneer, or any non-wood-based material, which are arranged between the backside layer and the frontside layer
d) an integrated circuit, a memory device, a tracking device, a sensing device, an antenna and/or an electromagnetic coil, preferably embedded in the card
e) optionally, a support layer, especially made of cellulosic material, e.g. paper, densified wood, and/or fleece, which is arranged between the backside and the frontside, for carrying one or more of the integrated circuit, the memory device, the tracking device, the sensing device the antenna and/or the electromagnetic coil whereby the layers are laminated and at least one of the layers of wood veneer, in particular the frontside and the backside layers, especially all of the layer of wood veneer, are made of densified wood veneer.

A laminated structure with such a configuration is highly suitable for cards, especially a payment card, a credit card, a debit card, an identity card, a member card and/or an access card.

Thereby, preferably, a thickness of the frontside and the backside is larger than a thickness of the one or more optional further layers.

Furthermore, the inventive method can be part of a method for producing a product or implemented as a method for producing a product. Thus, a further aspect of the invention is concerned with a method for producing a product comprising the steps of (i) densifying a hygroscopic material or a stack as described above and/or producing a laminated structure as described above, and (ii) manufacturing the product at least partly from the densified material and/or the laminated structure obtained in step (i). Thereby, the product in particular is a musical instrument or a part of it, a furniture, a door, a door handle, a floor covering, a wall covering, a revetment, an automotive part, a covering for a ceiling, a sports equipment, a load-bearing element, a card, an electronic device, or a casing for an electronic device, e.g. a key fob, a data storage device, for example a USB stick, or a casing for a mobile phone.

For example, an electronic device can have any shape, e.g. card-shaped, cuboid, sphere-shaped, or ring-shaped. The electronic device can feature any kind of electronic functionality, e.g. a sensor function, an access tag or function, identity function, an audio and/or display function.

Especially the electronic device is a wearable, i.e. a computing device worn on the body. For example, the wearable is configured as a finger ring, a bracelet, a protective sports equipment, a watch, or as glasses.

Especially, the product is a card, especially a payment card, a credit card, a debit card, an identity card, a member card and/or an access card.

Especially preferred, the card is produced such that it comprises:

a) a backside made of a layer of a densified or non-densified wood veneer
b) a frontside made of a layer of a densified or non-densified wood veneer
c) optionally, one or more further layers of a densified or non-densified wood veneer, or any non-wood-based material, which are arranged between the backside layer and the frontside layer
d) an integrated circuit, a memory device, a tracking device, a sensing device, an antenna and/or an electromagnetic coil, preferably embedded in the card
e) optionally, a support layer, especially made of cellulosic material, e.g. paper, densified wood and/or fleece, which is arranged between the backside and the frontside, for carrying one or more of the integrated circuit, the memory device, the tracking device, the sensing device, the antenna and/or the electromagnetic coil whereby the layers are laminated and at least one of the layers of wood veneer, in particular the frontside and the backside layers, especially all of the layer of wood veneer, are made of densified wood veneer.

Especially, the card fulfills the requirements of ISO/IEC 7810:2019 (including ISO/IEC 7811, 7813, 7816 and 14443).

Further beneficial features of densified materials, products and cards are described below. Thus, the inventive methods preferably are implemented such these features result.

A further aspect of the present invention is related to a densified material obtainable or obtained by the method as described above.

Especially, the above described methods are implemented such that densified materials with properties as described in the following result.

In particular, the densified material is based on a plant material, natural fiber material, synthetic fiber material, mineral wool, animal wool, protein based material. In particular, the term "based on" means that the densified material to an extent of at least 50 wt. %, in particular at least 75 wt. %, especially at least 90 wt. %, in particular at least 99 wt. % or 100 wt. %, consists of the respective material.

Especially, the densified material is based on wood. Preferably, the densified material is densified solid wood and/or densified wood veneer. In particular, the wood is selected from any type of angiosperms (hardwoods, flower and fruit bearing, deciduous, e.g. maples, oaks, beech, hickory cherry, walnut) or gymnosperms (softwoods, coniferous, needle-like leaves, evergreen, e.g. firs, spruces, pines) from natural forests or plantations. Furthermore, the part of the tree/wood can be sapwood or heartwood, earlywood or latewood, burls/burrs, roots, leaves and barks.

In particular, the densified material, especially a densified wood material, in particular a wood veneer, has a thickness of 0.05-2 mm, especially 0.1-1 mm, in particular 0.15-0.3 mm.

According to a highly preferred embodiment, the obtainable or obtained densified material is free of additional components, especially free of additional natural polymers, synthetic polymers, natural resins, synthetic resins, waxes, sulfur, and/or molten metals. In this case, the densified material is purely based on the hygroscopic material as such. "Free of" means that a proportion of the additional components is below 1 wt. %, especially below 0.1 wt. % or 0 wt. %.

Especially, the obtainable or obtained densified material is a translucent material, in particular a translucent wood material. Translucency of the wood materials can be controlled by the thickness, wood type and lignin content of the wood material. For example, lignin rich wood becomes translucent in the inventive method. Thus, the densification preferably is effected such that the hygroscopic material to be densified, e.g. wood material, is rendered translucent.

In particular, if the densified material is a wood material, the tensile modulus or young's modulus, respectively, is 10'000-50'000 MPa, especially 12'000-40'000 MPa, in particular 15'000-35'000 MPa. This is in particular true for wood of type oak, maple and birch. The tensile modulus defines the relationship between stress and strain in the material in the linear elasticity regime of a uniaxial deformation in the longitudinal direction.

Preferably, if the densified material is a wood material, the tensile strength is 40-400 MPa, especially 45-300 MPa, in particular 50-250 MPa. This is in particular true for wood of type oak, maple and birch. Within the present context, the tensile strength is meant to be the maximum amount of tensile stress that the material can take before failure in the longitudinal direction.

Preferably, if the densified material is a wood material, the density of the densified wood is from 900-1'600 kg/m$^3$, especially 1'200-1'600 kg/m$^3$.

A further aspect of the present invention is a laminated structure comprising at least two laminated layers, especially a laminated wood structure, whereby at least one, especially at least two, of the laminated layers are made of the densified material as described above and/or the laminated structure is obtainable or obtained by the method as described above. Thereby, preferably, the densified material is present in the form of a densified wood veneer.

Especially, the above described methods are implemented such that laminated structures with properties as described in the following result.

Especially, each wood layer can vary in thickness, wood species, wood fiber orientation, degree of density, degree of roughness/smoothness, relative wood fiber orientation (relative angles from one layer to another layer) of the different wood layers. Also a laminating adhesive can vary in its type, chemical composition, dry thickness, origin (synthetic, natural, fossil or bio-based) and physical, chemical and mechanical properties and application technique (such as casting, dipping, brushing, spraying or inlaying of the glue in liquid, gelatinous or solid (film, foil) form. In particular, the laminated structure comprises two, three, four, five, six, seven, eight, nine, ten or more laminated layers. Thereby, preferably, all of the laminated layers are made of the densified material as described above, especially of densified wood veneer. A combination of densified and non-densified material in the same laminated wood structure is also possible.

Preferably, the layers of the laminated structure are firmly bonded, e.g. with an adhesive and/or an adhesive foil.

Especially, in the laminated structure at least one layer of a densified material as described above is combined with one or more other layers, e.g. layers of non-densified materials. However, most preferred, all of the layers of the laminated structure consist of densified material as described above.

For example, in the laminated structure at least one layer of a densified wood veneer as described above is combined with one or more other layers, e.g. layer(s) of another wood veneer, e.g. a non-densified wood veneer. However, most preferred, all of the layers of the laminated structure consist of densified wood veneers as described above.

Such kind of laminated structures can be used to obtain materials with improved properties, e.g. improved mechanical properties.

Especially, if the materials of the individual layers in the laminated structure have a grain direction, such as in a laminated wood structure, for example, at least two layers of laminated structure are oriented with different grain directions.

Especially, all adjacent layers in the laminated structure have a different grain direction.

For example an angle between the grain directions of the at least two layers oriented with different grain directions, especially between the adjacent layers, is between 0 and 360°, especially 1°-359°, in particular 30°-45°, especially 60-90°.

Another preferred laminated product, especially a wood product, comprises (i) one, two or more layers of the densified material as described above and (ii) one, two or more layers of other materials such as e.g. metals, ceramics, glass, paper, plastics, resins, or any other non-wood-based materials. Thereby, preferably, there is a layer of synthetic and/or natural adhesives between each pair of neighboring layers.

Especially, such a product is a high-density laminated veneer, wood lumber, and/or timber with integrated layers of non-wood-based material. The layers of other materials can e.g. be made of aluminum, steel, copper, silver, gold, titanium, plastics (PLA, PU, Polyamide, Polyester, PET, PC, PP, PE, PVC etc.).

Put differently, such a product is an inter-combination of non-wood-based materials with densified wood materials, for example a laminated sandwich structure comprising layers of densified wood, paper, metal foil (e.g. aluminum, gold, steel), Plexiglas, plastic foils etc. in arbitrary sequence of the various layers. Hereby each wood layer can vary in thickness, wood species, wood fiber orientation, degree of density, degree of roughness/smoothness, relative wood fiber orientation (relative angles from one layer to another layer) of the different wood layers. Also the non-wood-based material layer can vary in their compositional, structural, architectural, dimensional, physical, mechanical and chemical properties. Also, a laminating adhesive can vary in its type, chemical composition, dry thickness, origin (synthetic, natural, fossil or bio-based) and physical, chemical and mechanical properties.

Preferably, laminated products as described above are obtainable or produced with the inventive method whereby in step a) a stack comprising the layers to be laminated. Thereby, preferably, there is a layer of synthetic and/or natural adhesives between each pair of neighboring layers to be laminated. In this case, the laminated product is produced in a one-step process. However, it is also possible to produce the laminated product in a two-step or multi-step process in which individual layers are bonded together consecutively.

For example, for producing a laminated product which is an inter-combination of non-wood-based materials with densified wood materials, a stack of at least one layer of a non-densified wood, e.g. a veneer, and at least one layer of another material can be provided in step a). Thereby, preferably, there is a layer of synthetic and/or natural adhesives between each pair of neighboring layers. Preferably, step d) is effected with sub-steps d1) to d4) as described above.

A further object of the present invention is a product comprising a densified material, especially densified wood, or a laminated structure, especially a laminated wood structure, as described above. Thereby, preferably, the product is a musical instrument, a furniture, a door, a door handle, a floor covering, a wall covering, a revetment, an automotive part, a covering for a ceiling, a sports equipment, e.g. skis, a card, an electronic device, or a casing for an electronic device, e.g. a transponder, a key fob, a data storage device, for example a USB stick, or a casing for a mobile phone.

For example, an electronic device can have any shape, e.g. card-shaped, cuboid, sphere-shaped, or ring-shaped. The electronic device can feature any kind of electronic functionality, e.g. a sensor function, an access tag or function, identity function, an audio and/or display function.

Especially the electronic device is a wearable, i.e. a computing device worn on the body. For example, the wearable is configured as a finger ring, a bracelet, a protective sports equipment, a watch, or as glasses.

In particular, the product comprises an electronic functionality, a magnetic functionality, and/or an optical label, especially comprised within the product and/or placed on a surface of the product.

Especially, the product comprises an identification tag and/or a security tag, in particular comprised within the product and/or placed on a surface of the product.

For example, the product comprises a hologram and/or a magnetic strip on the surface of the product and/or the product comprises radiopaque metal particles and/or a chip embedded within the product. These features can serve as security and/or identification tag.

According to a preferred embodiment, above-mentioned electronic functionalities, magnetic functionalities, optical labels, identification tags and/or a security tags can be embedded within the product and/or placed on a surface of the product during the inventive method and/or later on.

Most preferred, the product is a card, especially with electronic functionality, comprising at least one layer of a densified wood veneer as described above.

A card is meant to be a flat body whereby a length and a width of the card is at least times, especially at least 20 times, preferably at least 50 times, longer than its thickness.

In particular the card has an overall thickness of 0.5-2.5 mm, especially 0.6-1.5 mm, preferably 0.7-0.9 mm or 0.8 mm. Preferably, the card has a size of 80-100 mm×50-70 mm×0.5-1.5 mm, in particular a size of 90 mm×60 mm×0.8 mm.

Thereby, preferably, the card is a payment card, a credit card, a debit card, an identity cards, a member card and/or an access card.

In particular, at least one layer of the densified wood veneer, especially all layers of wood veneers, has/have the same length and width as the card.

Especially, a back side and a front side of the card each are made of a layer of a wood veneer, especially a densified wood veneer as described above.

With respect to the overall weight of the card, the card preferably consists to an extent of at least 40 wt. %, in particular at least 50 wt. %, especially at least 75 wt. % or 95 wt. % or 99 wt. %, of wooden material, especially of densified wood as described above.

According to a preferred embodiment, the card comprises at least two layers of laminated wood veneer, whereby, preferably, both of the at least to layers of wood veneer are densified wood veneers as described above.

Especially, at least two of the at least two layers of laminated wood veneer are oriented with different wood grain directions. Especially, all adjacent layers of laminated wood veneer have a different grain direction.

For example an angle between the grain directions of the at least two layers, especially between the adjacent layers, of laminated wood veneer is between 0 and 360°, especially 1-359°, in particular 30°-45°, especially 60-90°.

With such an arrangement, the mechanical properties and stability of the card can be improved significantly. This will give rise to a more homogenous mechanical stability as the stiffness in the longitudinal and traversal axis of the card are similar.

In particular, each of the layers of wood veneer has a thickness of 0.1-0.3 mm. With such thin layers, it is possible to provide the card in the form of a laminated structure with several layers of wood veneers resulting in further improved mechanical properties.

Preferably, the at least two layers of laminated wood veneer are bonded together and/or with other layers of the card with an adhesive. This allows for a very uniform interconnection between the layers of the card.

According to a special embodiment, the card comprises an integrated circuit (IC), memory device, a tracking device, a sensing device, an antenna and/or an electromagnetic coil, especially embedded within the card and/or placed on a surface of the card. For example, the card can have one or more of the following functionalities: radio-frequency identification (RFID) (e.g. 125 KHz, 860-960 MHz, 13.56 MHz or other frequencies), near-field communication (NFC), data storage and/or energy harvesting functionality.

With these components, it is possible to realize cards with electronic functionality such as required by payment cards, access cards, member cards and the like.

Especially, the integrated circuit (IC), memory device, the tracking device, the sensing device antenna and/or electromagnetic coil, if present, are placed in a recess of the at least one layer of densified wood veneer. With such an arrangement, the whole electronic functionality can be included inside the card without any protruding elements.

Especially, the card furthermore comprises a support layer, made of plastic materials, e.g. PVC or PET foil, bio-based plastic materials, e.g. poly lactic acid (PLA), protein-based material such as gelatine or other protein glue, pectin, starch and/or any other cellulosic material, e.g. paper and/or fleece. The support layer is in particular arranged between the backside and the frontside of the card. The support layer can be used for carrying a component to be included in the card, e.g. one or more of the integrated circuit, the memory device, the tracking device, the sensing device, the antenna and/or the electromagnetic coil.

A further subject of invention is a core-layer for a card. The core-layer is also called inlay for a card. Especially, the inlay is a support layer made of densified wood carrying the electronic functionalities as described above, e.g. an integrated circuit, a tracking device, a sensing device, an antenna, an electromagnetic or inductive coil, an electronic chip, a transistor, a diode, a die, a module and/or CPU, etc.

Electronic entities can be integrated into or onto the densified wood material, before or after the densification process, by methods such as gluing, pressing in or stitching, metal wires or printing conductive metal inks (inkjet, drop on demand), yielding highly densified wood material with electronic functions and functionalities, such as the electronic inlays for the electronic wood cards.

A wooden inlay for the card with integrated electronic functionality preferably is produced with the inventive method whereby:

(i) integration of the electronic functionality onto the wood support layer is effected prior to wood densification or step a), especially via embossing, gluing, printing (inkjet, drop on demand), stitching etc., followed by densification according to the inventive method as described above, or (ii) the electronic functionality is integrated into or onto the densified wood layer obtained with the inventive method as described above, especially via ultrasound-assisted or thermally-assisted or glue-assisted wire coil embedding, embossing, gluing, printing or stitching, or (iii) electronic functionalities are created during the densification process or the inventive method, respectively, especially by making use of the high pressures and temperatures during the process, e.g. by sintering, melting, thermolysis or reduction of metallic precursors. Metallic precursors can e.g. be selected from a) metal powders (sizes: nano, micro, millimeter), b) metal particles (particle sizes nano, micro millimeter) dispersions and/or metal inks, c) organo-metallic solutions into or onto the non-densified wood support layer prior the densification step.

(iv) electronic functionalities are created during the densification process, especially by using high pressures and temperatures during the process for embossing or gluing metal foils on to the wood surface. This can be done with or without an adhesive between the wood and metal foil. Finally this results in a laminated layer of wood and a metal layer, preferably on both sides of the wood specimen, in particular only on one side. The metal layer is then partially removed, e.g. with CNC milling machine, giving a desired structure with inductive or capacitative features, allowing for the integration of a RFID or NFC Chip or semi-conductor die.

Especially, in method (ii) ultra-sound assisted, thermally-assisted or glue-assisted wire coil embedding is a beneficial method. Thereby, preferably, a densified wood veneer, which preferably is either coated with a layer of a polymer and/or glue film on the surface or which is impregnated with the polymer, is used in the inventive method. Especially the polymer or the glue film is a thermoplastic so that it becomes soft or pliable or moldable during the embedding process, thus enclosing the wire coil after cooling. Preferably the thermoplastic is bio-based and biodegradable polymers and e.g. PLA, PHA, PHB, PHBHV and their derivatives, or biodegradable polymers such as polyesters and polyamides, natural polymers such as starch, lignin, pectin, cellulose, keratin, chitin, proteins and their derivatives. Furthermore, in method (ii), for the glue assisted wire coil embedding, the metal wire preferably is coated with a glue, which adheres to the densified wood surface.

Furthermore, for both processes described above for producing laminated structures, i.e. the one-step (simultaneous densification and lamination) and the two- or multi-step (lamination of densified wood) process, the inlay can be used as an adhesive layer. In this case, preferably, the electronic functionalities are integrated in an adhesive foil made of a) bio-adhesives, such as protein, milk, bone, skin based adhesives, plant-based adhesives, such as starch, lignin and/or pectin-based, and/or b) synthetic adhesives, such as polyurethane-based, non-isocyanate polyurethane-based, epoxy-based, (meth-)acrylate-based adhesives, and/or other synthetic adhesives. In order to produce a card, the electronic functionalities integrated in the adhesive foil are then used to laminate the wood layers and integrating the required electronic functionalities (RFID, NFC or UHF chip, semi-conductor DIE, module, CPU, antenna, wire, inductive coil, capacitive entities etc.).

According to a further preferred embodiment, at a card surface, a pattern of metal contacts for establishing an electrical connection to the integrated circuit, tracking device, sensing device, memory device, antenna and/or electromagnetic coil is arranged. With such contacts it is possible to establish a wired connection to one or more of the electronic components of the card in a suitable reader. However, it is possible to provide a card without any contacts, if required.

Especially, a card surface comprises an engraving, in particular in the form of a logo, letters and/or numbers. Thereby, preferably, the engraving is coated with a color that is different from the color of the surrounding area. In particular, the engraving is obtained by laser engraving.

For example, the engraving can represent personal, legal and/or commercial data, including a name of a holder of the card, a name of the issuer of the card, a member name, a number of the card, a number of a bank account, a logo of the issuer of the card, promotional information, a practical advice, security information, legal information, instructions and the like.

Moreover, the densified wood surfaces, especially card surfaces, can be directly printed with common inkjet printers, e.g. based on continuous inkjet, drop-on-demand or bubble-jet techniques).

Furthermore, if desired, the card may be coated with a transparent coating, e.g. a wax or a lacquer.

A highly preferable card comprises:

a) a backside made of a layer of a densified or non-densified wood veneer b) a frontside made of a layer of a densified or non-densified wood veneer c) optionally, one or more further layers of a densified wood veneer, non-densified veneer or any non-wood-based material, which are arranged between the backside layer and the frontside layer d) an integrated circuit, a memory device, a tracking device, a sensing device, an antenna and/or an electromagnetic coil, preferably embedded in the card e) optionally a support layer, e.g. a plastic layer, a layer of cellulosic material, a layer of densified wood veneer, which is arranged between the backside and the frontside, for carrying one or more of the integrated circuit, the memory device, the tracking device, the sensing device, the antenna and/or the electromagnetic coil, whereby the layers are laminated together and at least one of the layers of wood veneer, in particular the frontside and the backside layers, especially all of the layer of wood veneer, are made of densified wood veneer as described above.

In particular, if present, the support layer is based on PVC, PET, PC, PLA, paper, fiber mat or densified wood veneer.

Especially, the card fulfills the requirements defined in standard ISO/IEC 7810:2019.

Further advantageous configurations of the invention are evident from the exemplary embodiments.

BRIEF DESCRIPTION OF THE SEVERAL VIEWS OF THE DRAWINGS

Further advantages, features, and details of the various embodiments of this disclosure will become apparent from the ensuring description of a preferred exemplary embodiment and with the aid of the drawings. The features and combinations of features recited below in the description, as well as the features and feature combination shown after that in the drawing description or in the drawings alone, may be used not only in the particular combination received, but also in other combinations on their own, without departing from the scope of the disclosure.

The drawings used to explain the embodiments show.

In the figures, the same components are given the same reference symbols.

DETAILED DESCRIPTION OF THE INVENTION

Figure 1:
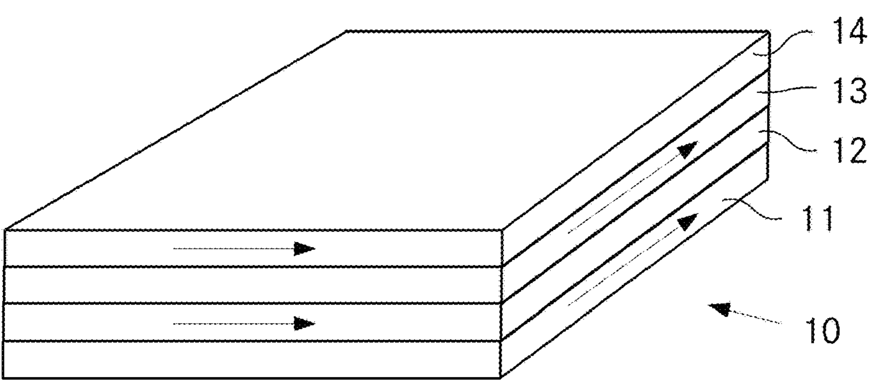
FIG. 1A laminated structure consisting of four rectangular layers of densified wood veneer whereby adjacent layers have different wood grain directions.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that at least one of "A, B, and C" should not be understood as including only one of A, only one of B, only one of C, or any combination of A, B, and C.

In order to produce a densified wood veneer, the following process has been followed:

In a first step, a wood veneer specimen with a thickness of about 0.6 mm, e.g. of maple wood, was used as hygroscopic materials and pre-conditioned to a moisture content of about 12% wood moisture.

In a second step, the pre-conditioned wood veneer specimen was packed in a gas-tight manner in temperature resistant and moisture tight metal foil.

Subsequently, the foil-packed wood veneer specimen was pre-heated to about 70° C., in a mechanical press in contact mode with only 1 MPa pressure.

Then the pressure was raised to 10 MPa at a rate of 1 MPa/minute and kept for 25 minutes at the temperatures of 70° C. as set before.

Thereafter, without affecting the pressure set before, the temperature was raised to a temperature of about 150° C. at a rate of 6-8 K/minute and kept for 45 minutes. After this pressing and heating process, the temperature was cooled down actively to room temperature and the pressure was released.

As a result of this process, a densified wood veneer with a thickness of 0.3 mm, a density of 1'250 kg/m$^3$, and a tensile elastic modulus of 27'500 MPa was obtained.

As it turned out, the densified wood veneer has a high color stability. Specifically, the surface color difference ΔE (according to EN ISO 11664-4) after exposure to UV radiation (>500 W/m$^2$, <400 nm) or simulated sunlight (>500 W/m2, wavelengths 190-850 nm) for 1-48 hours (initial radiation time), typically 24 hours, or natural sunlight for 6-300 hours is less than 4, when compared to the surface color before exposure to the UV radiation. After the initial radiation time (i.e. 1-48 hours) the surface color remains essentially stable.

According to another example, in order to produce a densified wood veneer, the following process has been followed:

In a first step, a wood veneer specimen with a thickness of about 0.6 mm, e.g. of maple wood, was used as hygroscopic materials and pre-conditioned to a moisture content of about 12-13% wood moisture.

In a second step, the pre-conditioned wood veneer specimen was packed in a gas-tight manner in temperature resistant and moisture tight metal foil.

Subsequently, the foil-packed wood veneer specimen with adjusted moisture content of 12-13% was pre-heated to about 70° C. in a mechanical press in contact mode with only 1 MPa pressure.

Then the pressure was raised to 30 MPa at a rate of 15 MPa/minute and kept for 0.5-5 minutes at the temperatures of 70° C. as set before.

Thereafter, without affecting the pressure set before, the temperature was raised to a temperature of about 170-185° C. at a rate of 10-20 K/minute and kept for 10 minutes. After this pressing and heating process, the temperature was cooled down actively to room temperature and the pressure was released.

FIG. 1 shows a laminated structure 10 which was produced by laminating four rectangular layers of densified wood veneer 11, 12, 13, 14 as obtained in the above described process. The structure was formed by bonding adjacent layers 11, 12, 13, 14 together with an adhesive, e.g. a polyurethane or any other adhesive.

As indicated by the arrows in FIG. 1, the wood grain direction of adjacent layers are perpendicular to each other. This gives a highly stable laminated structure with reduced flexibility.

Figure 2:
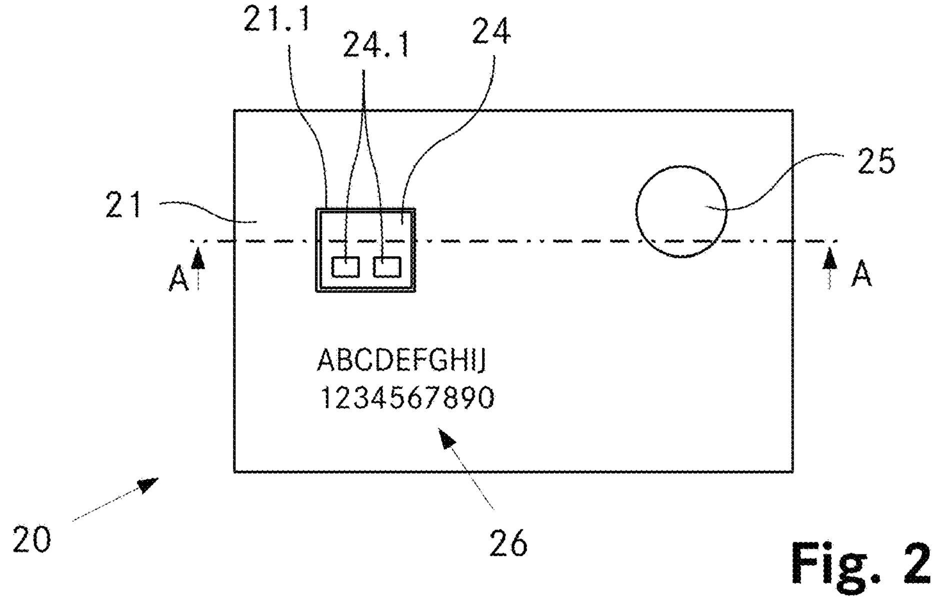
FIG. 2A top view onto a wooden credit card made of densified veneer with an integrated chip and engraved letters, numbers and logo on the outer surface.
Figure 3:
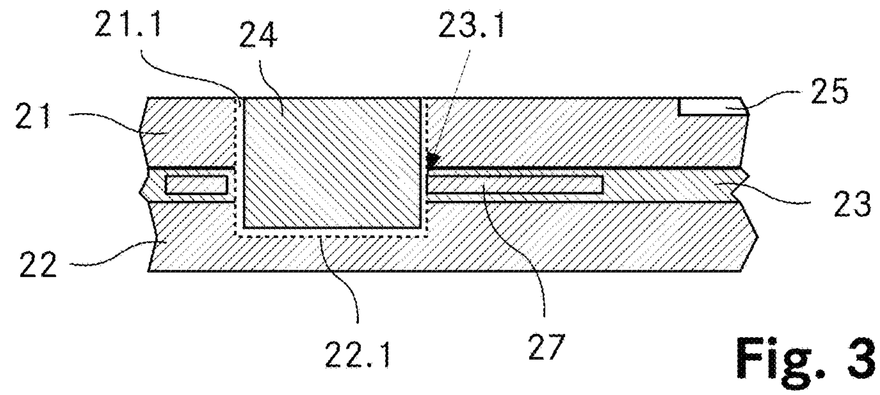
FIG. 3A partial view of the cross-section along line A-A of the card of in FIG. 2.

A wooden electronic card 20 as shown in FIGS. 2 and 3 and having a size of 85.5 mm×54 mm×0.8 mm was produced by according to the following process:

An upper layer 21 (frontside of the card) and a lower layer 22 (backside of the card) each consisting of a densified wood veneer obtained according to the above described process were provided and cut to a size of about 90 mm×60 mm with a computerized numerical control laser engraving and cutting machine (CNCL).

A middle layer 23 consisting of a support sheet (densified veneer) with an integrated/glued electromagnetic coil 27 was provided and cut to the same size as the upper and lower layers 21, 22.

In the upper layer 21 and the middle layer 23, using the CNCL, a rectangular opening 21.1, 23.1 for an integrated circuit chip 24 with electrical surface contacts 24.1 was cut. In the lower layer 22, a rectangular recess 22.1 (deepness of approximately 0.1 mm) was engraved to provide additional place for the chip 24.

A polyurethane foil or gelatin/protein-glue sheet (40-80 g/m$^2$; area density depending on type of wood) was applied on the inside of the upper layer 21 and the lower layer 22 as an adhesive foil. Each layer 21, 22, 23 as well as the chip 24 were carefully positioned and assembled to obtain the basic structure of the card 20. The assembled basic structure was then placed in a vacuum bag, which was then evacuated in order to apply a pressure of approximately 1 MPa. The vacuum was maintained for 6 hours.

The electronic functionality, e.g. a contactless payment function, of the card was tested before the outer surface of the upper layer 21 was engraved using the CNCL. Thereby, a first engraving 25 consisting of a logo and a second engraving 26 consisting of characters and numbers were produced. Thereby, the moving speed and laser power were adjusted in order to avoid burning of the wooden surface. Further engravings were provided on the outer surface of the lower layer 22 (not shown in FIGS. 2 and 3).

Thereafter, the final shape of the card was cut using the CNCL (using a different set of moving speed and laser power).

Subsequently, the engravings 25, 26 were colored using a silver color pen. The drying time was about 2 hours.

Then the front side 21 as well as the backside 22 of the card 20 were sanded and polished with by using sanding papers with gradually increasing fineness (180, 240, 320 and 600 grit size)

After testing the card functionality, e.g. contactless and contact payment function, the card was ready for use.

As shown in the cross-section of the card 20 in FIG. 3, the chip 24 and the electromagnetic coil 27 are fully embedded within the card body. Cards with such a structure turned out to be fully functional as required by standard ISO/IEC 7810:2019.

Figure 4:
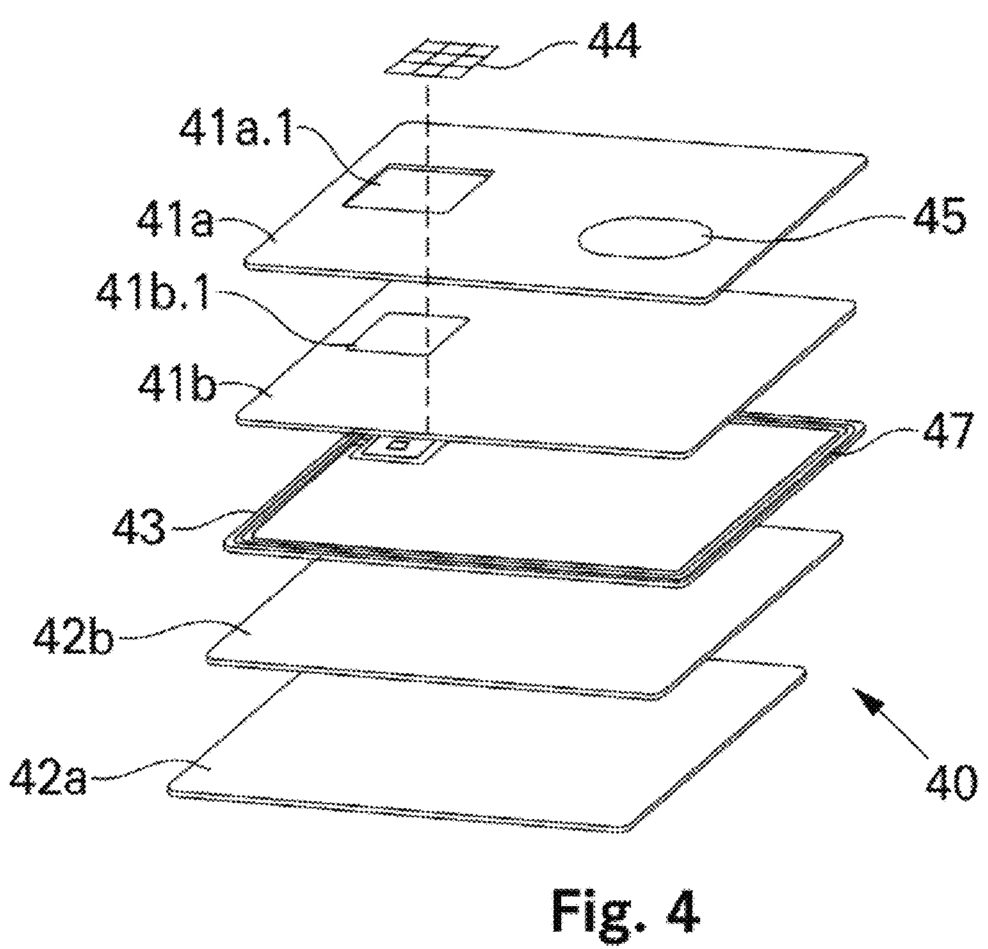
FIG. 4 An exploded assembly drawing of another card with electronic functionality.

FIG. 4 shows an exploded assembly drawing of another card 40 with electronic functionality. Card 40 comprises an upper part consisting of two laminated densified wood veneers 41*a*, 41*b*. The wood grain direction of the densified wood veneers 41*a*, 41*b* are perpendicular to each other. Both wood veneers 41*a*, 41*b* comprise a rectangular opening 41*a*.1, 41*b*.1 for receiving an integrated circuit chip 44. The outermost wood veneer 41*a* furthermore carries a printed logo 47 on the outer side.

A lower part of card 40 consists of two further laminated densified wood veneers 42*a*, 42*b*. Also in this case, the wood grain direction of the densified wood veneers 42*a*, 42*b* are perpendicular to each other.

In the middle of the card, there is an inlay 43 consisting of a wood veneer carrying an electromagnetic antenna 47 with contacts for chip 44. All of the layers 41*a*, 41*b*, 43, 42*a*, 43*b* of the card are adhesively bonded together in the final product.

Card 40 consists of five densified wood veneers whereby the wood grain direction of adjacent veneers are perpendicular to each other. Therefore, card 40 is especially robust from a mechanical point of view.

Figure 5:
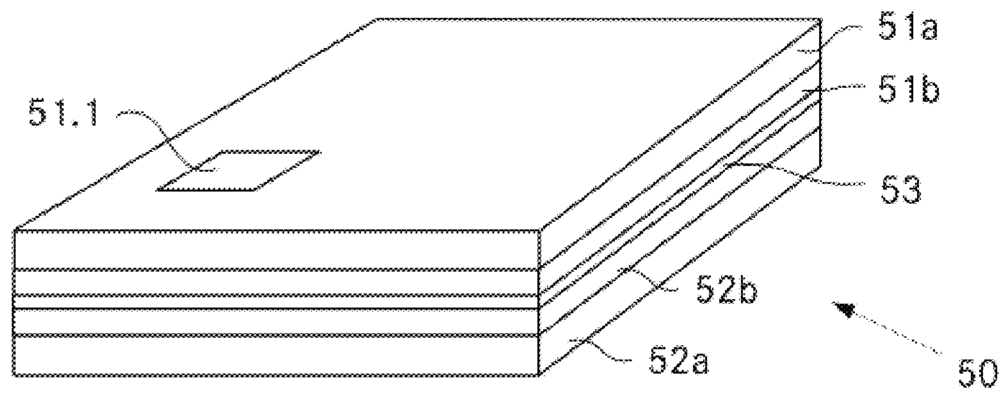
FIG. 5A perspective view of another card with electronic functionality.
Figure 6:
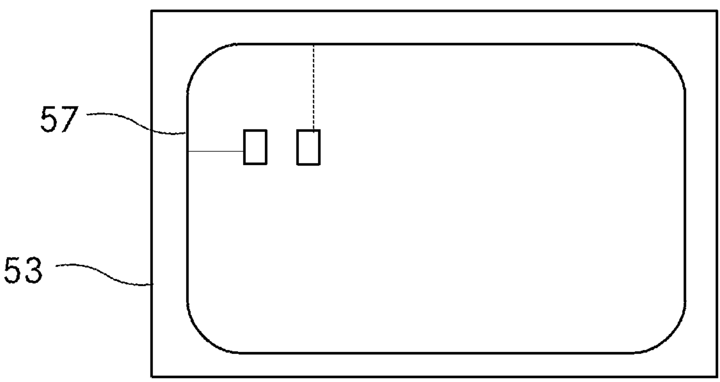
FIG. 6 The structure of the central inlay layer of the card of FIG. 5.

FIG. 5 shows a perspective view of another card 50 with electronic functionality. The card 50 is a laminated structure made from five layers of a hygroscopic material. Specifically, it comprises two top layers 51*a*, 52*a* of wood veneer, two thin mid layers 51*b*, 52*b* of wood veneer and an inlay layer 53 comprising a metal antenna 57 with contacts for a chip on a paper. The structure of the inlay layer 53 is shown in FIG. 6.

A thickness of each of the two top sheets 51*a*, 52*a* is for example 0.6 mm whereas a thickness of the two thin mid sheets 51*b*, 52*b* is for example 0.2 mm. The inlay layer 53 has for example a thickness of 0.1 mm.

Similar to card 40, card 50 comprises an opening or recess 51.1, respectively, for receiving an integrated circuit chip (not shown in FIG. 5). A symmetric setup as shown in FIG. 5 is suitable for direct connection or soldering, respectively, ("TE-Connect®"), i.e. conductive glue, "Asymmetric conductive foil (ACF)", i.e. conductive gluing tape and "Coil-on-Module", i.e. that belongs to group of Inductive-Coupling-chip-coupling technology. Also for the embedding of chip-coil-plug (the dual-interface chip and the antenna are on the same module/plug), the symmetric setup is suitable, as the card will not warp or deform beyond the requirements as defined in the ISO 7816.

Figure 7:
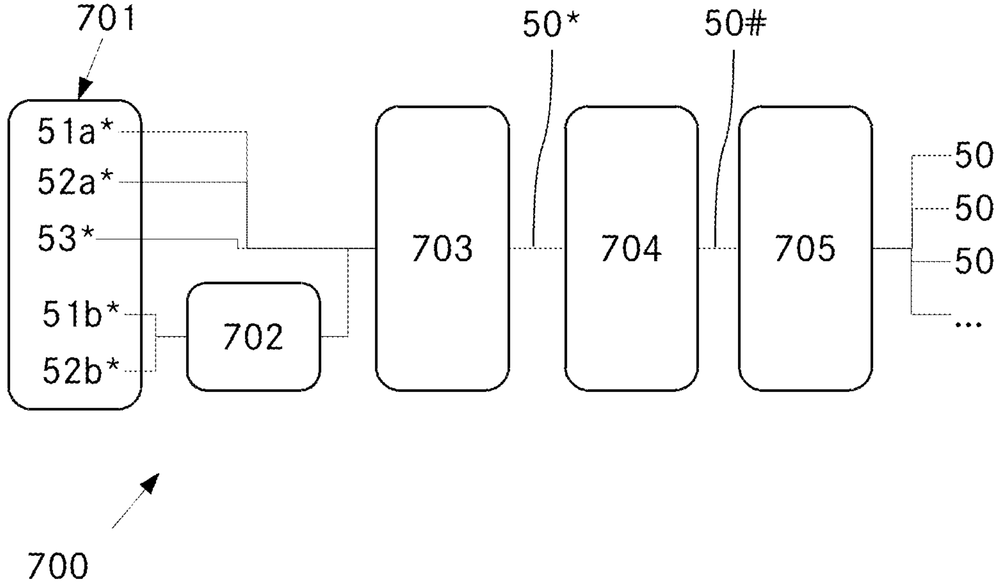
FIG. 7A flow chart illustrating the production method for obtaining a card as shown in FIG. 5.
Figure 8:
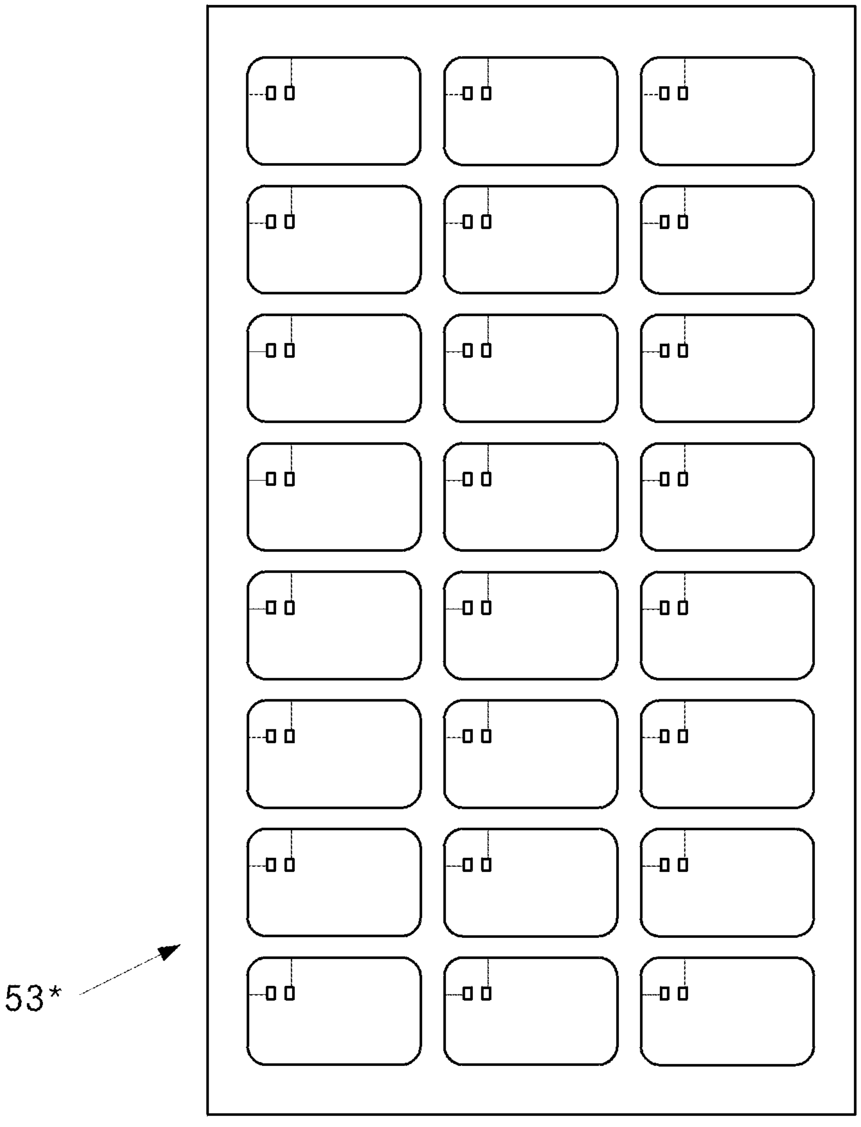
FIG. 8 An inlay sheet comprising a total of 24 metal antennas that are regularly spaced apart from each other on a sheet of paper.

FIG. 7 shows a flow chart 700 illustrating the production method for obtaining a card such as shown in FIG. 5. Specifically, in a first step 701, two top sheets 51*a, 52*a of wood veneer, two thin mid sheets 51*b, 52*b of wood veneer and an inlay sheet 53* are provided in undensified form (the undensified form is denoted with the "*"). The sheets are sized such that several cards as shown in FIG. 5 can be produced in parallel. For this, the sheets have a size of for example about 650 mm×300 mm. FIG. 8 shows the inlay sheet 53* comprising a total of 24 metal antennas that are regularly spaced apart from each other on a sheet of paper (in other implementations, sheet 53* can be produced with another number of antennas, e.g. 3×16=48 antennas).

Subsequently, the two undensified thin mid sheets 51*b, 52*b are impregnated in step 702 with an adhesive. Thereby, the sheets 51*b, 52*b are impregnated with an adhesive dissolved in a suitable solvent (e.g. water, ethanol, or any other organic solvent or the mixtures thereof), via soaking, vacuum-impregnation or surface coating such as brushing, spraying, on-rolling. For protein-based adhesives a proportion of 20-40 g/m$^2$ is used.

Then, the impregnated thin mid sheets 51*b, 52*b are layered on top of each other together with the other sheets in step 703 in order to obtain a stack 50* or sandwich structure, respectively, comprising the sheets in the following order: top sheet 51*a-impregnated mid sheet 51*b-inlay sheet 53*, impregnated mid sheet 52*b-top sheet 52*a. The wood grain direction of the mid sheets 51*b, 52*b is perpendicular to the wood grain direction of the top sheets 51*a, 52*a. Additionally, the top sheets are covered with a plastic foil or a layer of non-sticking material sheet/foil.

The so produced undensified stack 50* then is placed in a suitable press and densified in step 704. The pressure and time can be adjusted depending on the surface to densify, the required color and thickness. As a result of step 704, a laminated structure 50 #is obtained. To obtain a uniform pressure distribution in the press, the stack 50* to be densified can be placed in between a press insert such as steel plates and an elastic material, e.g. rubber of a thickness of a few millimeters. Thereby, the following layered structure is present: elastic material-steel plate-stack 50 #-steel plate-elastic material.

Subsequently, the laminated structure is cut 705 with laser cutting, knives, punch or other type of cutters to obtain several individual cards 50 as shown in FIG. 5. For finalizing the card, integrated circuit chip is placed and adhesively bonded in the recces 51.1 of the card 50.

While the densification process, laminated structure and wooden card described herein constitute preferred implementations and embodiments of this invention, it is to be understood that the invention is not limited to these embodiments, and that changes may be made therein without departing from the scope of the invention.

For example, the process as described above can be performed with other types of wood or with other hygroscopic materials, such as e.g. mentioned in the general description above. Also it is possible to perform the densification process with hygroscopic materials, especially solid wood, with a much higher thickness. Also, it is possible to replace the densified wood layer in the middle layer of the card with a paper sheet.

Also, additional process steps can be performed, e.g. the step of adding a chemical agent for treatment of the wood veneer before pre-conditioning or pressing.

Regarding the laminated structure 10 shown in FIG. 1, it is possible to replace one or more of the layers of densified veneer by a non-densified veneer and/or another material. However, at least one layer has to be of densified veneer. In principle, it is even possible to make use of layers of synthetic materials such as plastics, if desired. Of course, the number of layers may be changed to lower or higher numbers.

The wooden card 20 of FIGS. 2, 3 and 5 may be made of a different number of layers of wood veneer. Also it is possible to replace a layer of densified wood veneer with a non-densified wood veneer or another material. Of course, additional layers of synthetic materials and/or coatings may be added as well.

Furthermore, the process 700 shown in FIG. 7 can be replaced by another process in which individual cards are directly from sheets cut accordingly beforehand. Also it is possible densify the individual sheets 51*a**51*b****, 52*a**, 52*b**, 53*** before forming a stack and then laminating the sheets together to obtain the laminated structure. This structure then can be further processed to obtain the individual cards.

Another method of adding an adhesive layer to the mid layer sheet is attaching a thin film/foil of the adhesive to one or both sides of the mid layer sheet.

In a further implementation, a structuring sheet, e.g. surface structured wood, plastics and/or metal, is placed on top of the top sheets 51*a****, 52*a** in the process 700**. Such as structuring sheet serves as an embossing insert, that allows for structuring the outer surface of the top sheets.

For asymmetric conductive foil chip-coupling technology (ACF), unlike the setup shown in FIG. 5, an asymmetric construction, i.e. the inlay position closer to the top surface, is more suitable. Thereby, for example, a six layer construction can be realized with either six wood layers with a wood inlay as the second layer from the top or four wood layers and two paper layers with the top paper inlay layer. Thereby, as described above, the individual layers of anisotropic materials, i.e. wood, and the layers of isotropic materials, i.e. paper, fleece, PLA, Protein film etc., are provided with various thicknesses, e.g. ranging from 10 μm to 420 μm per layer, such that a card with high dimensional stability, suitable dimensions and proper positioning of antenna and chip module is obtained in which the anisotropic forces induced by environmental conditions are effectively compensated.

In summary, the present invention provides a highly beneficial process for densifying hygroscopic materials such as wood. This allows for producing very thin structures with a high dimension stability. Especially, the inventive process makes it possible to produce fully functional cards which are compatible with all kind of contactless and contact-based terminals known today.

Since the apparatus and its methods of manufacture are described in detail above are examples of embodiments, they can be modified to a wide extent by the skilled person in the usual manner without leaving the scope of the invention. In particular, the arrangements and the proportions of the individual elements with respect to each other are merely exemplary. Some preferred embodiments according to the invention have been disclosed above. The invention is not limited to the solutions explained above, but the innovative solutions can be applied in different ways within the limits set by the claims.

The invention claimed is:

1. A method for producing a laminated structure comprising the steps of:

a) densifying a layer of hygroscopic material comprising a natural hygroscopic material or wood, the densifying comprising:

i) providing the hygroscopic material to be densified;

ii) pre-conditioning of the hygroscopic material by adjusting the moisture content of the hygroscopic material to a value within a predefined moisture range, if required;

iii) simultaneously heating and pressing the hygroscopic material under predefined temperature and pressure conditions, wherein the moisture content of the hygroscopic material is kept constant; and iv) obtaining a densified material, wherein:

the layer of the hygroscopic material is densified in said method step of densifying a hygroscopic material, and afterwards laminated with at least one further layer, wherein the at least one further layer comprising at least one of:

(i) another layer of hygroscopic material that was densified according to said method step of densifying a hygroscopic material; and/or;

(ii) plant-based material, animal-based material and/or wood-based material comprising paper, plant and/or wood fibers, wood-chips, wood flour, cellulose, starch, lignin, wood bark, wood extractives, algae, chitin-based materials, chitosan-based materials, native wood, protein, coal, char, carbon black and/or active coal; and/or;

(iii) metals and/or metal alloys comprising Aluminum, Steel, Copper, Silver, Gold, and/or Titanium; and/or;

(iv) polymeric materials comprising synthetic polymers and/or biopolymers, e.g. PLA, PET, PP, PE, PVC and/or proteins; and/or; and (v) inorganic materials selected from ceramics, glass, stone, clay, metal-organic frameworks, zeolites, coal, char, carbon black and/or active coal; or other porous or non-porous inorganic materials, wherein the laminated structure is produced such that the laminated structure comprises:

a) a backside made of a layer of a densified or non-densified wood veneer;

b) a frontside made of a layer of a densified or non-densified wood veneer; and c) an integrated circuit, a memory device, a tracking device, a sensing device, an antenna and/or an electromagnetic coil, wherein the layers are laminated and at least one of the layers of wood veneer is made of densified wood veneer, and wherein the densification step comprises the following sub-steps:

iii1) the hygroscopic material is pre-heated to a first temperature at a first pressure and kept for a predefined first dwell time, wherein, the first pressure is equal to ambient pressure;

iii2) while keeping the first temperature, the pressure is raised to a second pressure, at a constant rate of pressure increase, and kept for a predefined second dwell time;

iii3) while keeping the second pressure, the temperature is increased to a second temperature, at a constant rate of temperature increase, and kept for a predefined third dwell time;

iii4) reducing the temperature to room temperature; and iii5) reducing the pressure to ambient pressure.

2. The method according to claim 1, wherein the laminated structure comprises one or more further layers of a densified or non-densified wood veneer, or any non-wood-based material, arranged between the backside layer and the frontside layer.

3. The method according to claim 1, wherein the laminated structure comprises a support layer, made of cellulosic material comprising paper, densified wood, and/or fleece, arranged between the backside and the frontside, for carrying one or more of the integrated circuit, the memory device, the tracking device, the sensing device, the antenna and/or the electromagnetic coil.

4. The method according to claim 1, wherein the laminated structure comprises an electrical wire.

5. The method according to claim 1, wherein the method comprises a further step of gas-tight packaging of the pre-conditioned hygroscopic material in a gas-tight casing.

6. The method according to claim 1, wherein the hygroscopic material to be densified is selected from plant materials, natural fiber materials, synthetic fiber materials, mineral wool, animal wool, skin-based materials, chitin-based materials, chitosan-based materials, protein-based materials, and/or the mixtures of such materials comprising grasses, algae, hemp fibers and/or egg shells.

7. The method according to claim 1, wherein the hygroscopic material to be densified is selected from wood, lumber, solid wood and/or wood veneers.

8. The method according to claim 1, wherein the method is effected such that a density of the obtained densified material is 1.01-100 times the density of the hygroscopic material before the densification.

9. The method according to claim 1, wherein in the densification step the moisture content of the hygroscopic material to be densified is adjusted to 5-30%.

10. The method according to claim 1, wherein in the densification step the pressure is increased to a value of 5-50 MPa, and/or the temperature is increased to a value 120-190° C.

11. The method according to claim 1, wherein an electronic functionality, a magnetic functionality, and/or an optical label is arranged on a layer of cellulosic material, or on a layer of paper.

12. The method according to claim 1, wherein at least two layers of a stack, or the outermost layers of the stack, are made of wood.

13. The method according to claim 1, wherein after the lamination step, a recess and/or an engraving is produced at least in the outermost layer, wherein, the recess and/or the engraving is produced by laser-engraving and/or laser cutting.

14. The method according claim 13, wherein a electronic functionality, a magnetic functionality and/or an optical label is placed in the recess, by adhesively bonding.

15. The method according claim 14, wherein the electronic functionality is arranged to be in electrical contact with another electrical functionality comprised in a stack.

16. A method for producing a product comprising the steps of (i) producing a laminated structure according to claim 1, and (ii) manufacturing the product at least partly from the laminated structure obtained in step (i), wherein the product is a musical instrument or a part of it, a furniture, a door, a door handle, a floor covering, a wall covering, a revetment, an automotive part, a covering for a ceiling, a sports equipment, a load-bearing element, a card, an electronic device, or a casing for an electronic device.

17. The method according to claim 16, wherein the product is a payment card, a credit card, a debit card, an identity card, a member card and/or an access card.

18. A method for producing a laminated structure comprising the steps of:

a) densifying a layer of hygroscopic material comprising a natural hygroscopic material or wood, the densifying comprising:

i) providing the hygroscopic material to be densified;

ii) pre-conditioning of the hygroscopic material by adjusting the moisture content of the hygroscopic material to a value within a predefined moisture range, if required;

iii) simultaneously heating and pressing the hygroscopic material under predefined temperature and pressure conditions, wherein the moisture content of the hygroscopic material is kept constant; and iv) obtaining a densified material, wherein in step a) of said method step of densifying a hygroscopic material, the hygroscopic material comprising a wood-based material to be densified is provided in form of a stack comprising at least two layers, wherein at least one layer, is made of hygroscopic material, and wherein all layers of the stack are densified together, and wherein the stack comprises an electronic functionality, a magnetic functionality, and/or an optical label; and wherein the densification step comprises the following sub-steps:

iii1) the hygroscopic material is pre-heated to a first temperature at a first pressure and kept for a predefined first dwell time, wherein, the first pressure is equal to ambient pressure;

iii2) while keeping the first temperature, the pressure is raised to a second pressure, at a constant rate of pressure increase, and kept for a predefined second dwell time;

iii3) while keeping the second pressure, the temperature is increased to a second temperature, at a constant rate of temperature increase, and kept for a predefined third dwell time;

iii4) reducing the temperature to room temperature; and iii5) reducing the pressure to ambient pressure.

* * * * *